(12) United States Patent
Kamisetty et al.

(10) Patent No.: US 10,326,613 B2
(45) Date of Patent: Jun. 18, 2019

(54) METHOD AND SYSTEM FOR PROCESSING SPANNING TREE PROTOCOL (STP) STATE IN A MULTICHASSIS LINK AGGREGATION (MLAG) DOMAIN

(71) Applicant: Arista Networks, Inc., Santa Clara, CA (US)

(72) Inventors: Jeevan Kamisetty, San Jose, CA (US); Soumen Biswas, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 93 days.

(21) Appl. No.: 15/490,123

(22) Filed: Apr. 18, 2017

(65) Prior Publication Data

US 2018/0302315 A1    Oct. 18, 2018

(51) Int. Cl.
*H04L 12/28* (2006.01)
*H04L 12/46* (2006.01)

(52) U.S. Cl.
CPC ................................ *H04L 12/462* (2013.01)

(58) Field of Classification Search
CPC ............... H04L 12/462; H04L 45/245
See application file for complete search history.

(56) References Cited

U.S. PATENT DOCUMENTS

| 8,355,348 | B1 * | 1/2013 | Miller | H04L 12/462 370/256 |
| 8,730,963 | B1 * | 5/2014 | Grosser, Jr. | H04L 12/462 370/219 |
| 2005/0141468 | A1 * | 6/2005 | Kim | H04W 76/10 370/338 |
| 2008/0031154 | A1 * | 2/2008 | Niazi | H04L 45/02 370/254 |
| 2008/0165705 | A1 * | 7/2008 | Umayabashi | H04L 12/462 370/256 |
| 2014/0112205 | A1 * | 4/2014 | Prakash | H04L 12/4625 370/256 |

* cited by examiner

*Primary Examiner* — Chi H Pham
*Assistant Examiner* — Fahmida S Chowdhury
(74) *Attorney, Agent, or Firm* — Chamberlain, Hrdlicka, White, Williams & Aughtry

(57) ABSTRACT

A method and system for processing spanning tree protocol (STP) state in a multichassis link aggregation (MLAG) domain. More specifically, a pair of MLAG peers in the MLAG domain receive and transmit bridge protocol data units (BPDUs) in order to update a spanning tree used to implement the STP. The pair of MLAG peers includes an active MLAG peer and a standby MLAG peer operatively connected via a MLAG peer link. Further, processing of STP state towards updating the spanning tree is held accountable by the active MLAG peer until it experiences failover, after which responsibility for processing the STP state transfers to the standby MLAG peer. Duplicate BPDUs received by the MLAG domain are tracked to refresh a retention period for the STP state retained by the MLAG domain, and thus, prevent the premature discarding of STP state.

13 Claims, 25 Drawing Sheets

METHOD AND SYSTEM FOR PROCESSING SPANNING TREE PROTOCOL (STP) STATE IN A MULTICHASSIS LINK AGGREGATION (MLAG) DOMAIN

BACKGROUND

In a multichassis link aggregation (MLAG) domain, it is important that both of the pair of MLAG peers maintain a synchronization of state information to retain the illusion of being a single network element. Traditionally, state information, such as, for example, spanning tree protocol (STP) state pertinent to the implementation of the STP, was shared through the encapsulation and subsequent tunneling of the state information between the pair of MLAG peers.

SUMMARY

In general, in one aspect, the invention relates to a method for processing spanning tree protocol (STP) state in a multichassis link aggregation (MLAG) domain. The method includes receiving, by an active MLAG peer of the MLAG domain, a first bridge protocol data unit (BPDU) from a first external computing system (ECS) operatively connected to the MLAG domain, deriving a first STP state from the first BPDU, making a first determination that the first STP state is different from a previous STP state, and processing, based on the first determination, the first STP state to obtain a first new STP state.

In general, in one aspect, the invention relates to a method for processing spanning tree protocol (STP) state in a multichassis link aggregation (MLAG) domain. The method includes receiving, by a standby MLAG peer of the MLAG domain, a first bridge protocol data unit (BPDU) from a first external computing system (ECS) operatively connected to the MLAG domain, deriving a first STP state from the first BPDU, making a first determination that the first STP state is different from a previous STP state, making a second determination that an active MLAG peer of the MLAG domain is operational, and transmitting, based on the first determination and the second determination, the first STP state to the active MLAG peer, through a MLAG peer link, for processing.

In general, in one aspect, the invention relates to a system. The system includes a plurality of external computing systems (ECSs) and an active multichassis link aggregation (MLAG) peer operatively connected to the plurality of ECSs. The active MLAG peer includes an active peer spanning tree protocol (STP) transceiver, an active peer STP processor, and an active peer system state database (SSD), wherein the active peer STP transceiver is programmed to receive a first bridge protocol data unit (BPDU) from a first ECS of the plurality of ECSs, derive a first STP state from the first BPDU, make a first determination that the first STP state is different from a previous STP state, and perform, based on the first determination, a first update to the active peer SSD using the first STP state, wherein the active peer STP processor is programmed to obtain, in response to the first update, the first STP state from the active peer SSD, process the first STP state to obtain a first new STP state, and store the first new STP state in the active peer SSD.

Other aspects of the invention will be apparent from the following description and the appended claims.

DETAILED DESCRIPTION

Figure 1:
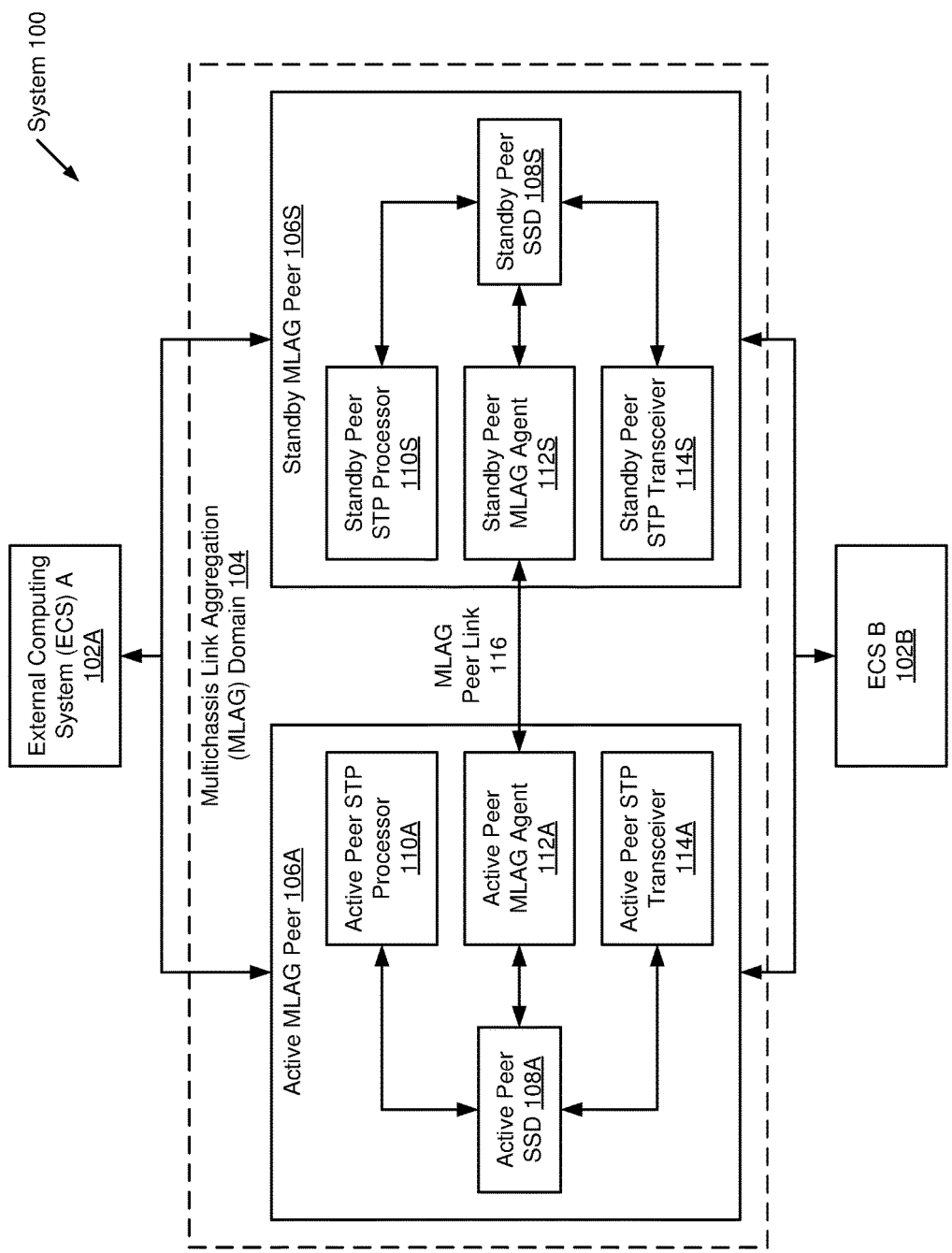
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for processing spanning tree protocol (STP) state in a multichassis link aggregation (MLAG) domain. More specifically, one or more embodiments of the invention are directed to the reception and transmission of bridge protocol data units (BPDUs), by a pair of MLAG peers in the MLAG domain, in order to update a spanning tree used to implement the STP. The pair of MLAG peers includes an active MLAG peer and a standby MLAG peer operatively connected via a MLAG peer link. Further, processing of STP state towards updating the spanning tree is held accountable by the active MLAG peer until it experiences failover, after which responsibility for processing the STP state transfers to the standby MLAG peer. In one embodiment of the invention, duplicate BPDUs received by the MLAG domain are tracked to refresh a retention period for the STP state retained by the MLAG domain, and thus, prevent the premature discarding of STP state.

Prior to the present invention, each MLAG peer in a MLAG domain included a singular process (e.g., a STP agent) that wholly handled all functionalities pertinent to the implementation of STP on the MLAG peer. Further, being single threaded, the aforementioned STP agent has a single context of execution. When considering a scaled STP setup, the STP agent can become quite busy processing various incoming BPDUs, which delays the periodic generation and transmission of new BPDUs to other network elements in a network. These delays cause unnecessary STP churn and extends the time to reach the STP steady state. To resolve this dilemma, the present invention splits the STP agent into two separate processes—a STP transceiver responsible for receiving and transmitting BPDUs, and a STP processor responsible for processing STP state derived from BPDUs in order to perform calculations of the spanning tree for implementing STP.

The division of the STP agent into a STP transceiver and a STP processor provides several advantages. One of these advantages is the promotion of STP scaling. Specifically, the splitting of STP responsibilities permits STP to achieve predictable BPDU transmission within specified timers, and avoids the redundant processing of received BPDUs. Another advantage provided by the segmentation of STP responsibilities includes the efficient utilization of the MLAG peer link. Specifically, in contrast to the previously implemented tunneling of BPDUs between MLAG peers, the use of an MLAG peer link for exchanging STP state grants increased bandwidth for data traffic between the MLAG peers. Yet another advantage, provided by the splitting of the STP agent into two separate processes, is the substantive reduction of load on an active MLAG peer. This reduction is afforded due to the local generation of BPDUs on either MLAG peer rather than the restrictive generation of BPDUs on just the active MLAG peer as is the case prior to implementation of the invention. Moreover, yet another advantage includes increased efficiency in mitigating an MLAG failover. Specifically, when a failover occurs on one MLAG peer, processes (e.g., the STP transceiver) executing on the other MLAG peer do not require a substantive allocation of CPU resources because most of the STP state necessary to generate BPDU transmissions and/or process received BPDUs already exists on the other MLAG (non-failover) peer.

FIG. 1 shows a system in accordance with one or more embodiments of the invention. The system (100) includes a multichassis link aggregation (MLAG) domain (104) and a number of external computing systems (ECSs) (102A, 102B). Each of these components is described below.

In one embodiment of the invention, the aforementioned components may be directly or indirectly connected to each other using any combination of wired or wireless connections. In embodiments in which the aforementioned components are indirectly connected to one another, there may be other computing systems (e.g., network elements, servers, etc.) (not shown) that facilitate communication between the aforementioned components. The aforementioned components may communicate with each other using any combination of wired and/or wireless communication protocols.

In one embodiment of the invention, MLAG is a network element behavior, where two network elements cooperate to provide the illusion of a single network element from the perspective of any externally connected device (e.g., the ECSs (102A, 102B)). The two network elements are referred to as MLAG peers (e.g., active MLAG peer (106A), standby MLAG peer (106S)), whereas their union is referred to as the MLAG domain (104). Further, MLAG peers are directly (or indirectly, via intermediate network elements) connected to one another via one or more links referred to as MLAG peer links (e.g., MLAG peer link (116)). In one embodiment of the invention, the network elements cooperate to provide the illusion of a single layer-2 (L2) Ethernet network element such that any externally connected device may connect using link aggregation groups (LAGs) made up of a set of links where one subset of the links terminates on the first network element, and the remaining links terminate on the second network element. One skilled in the art will recognize that maintaining this illusion requires several distinct types of coordination, including, but not limited to, spanning tree protocol (STP) coordination, link aggregation control protocol (LACP) coordination, media access control (MAC) address learning coordination, Internet group management protocol (IGMP) snooping coordination, IGMP, protocol independent multicast (PIM) coordination, and address resolution protocol (ARP) coordination.

In one embodiment of the invention, the MLAG domain (104) includes a pair of MLAG peers: an active MLAG peer (106A) and a standby MLAG peer (106S). Each MLAG peer (106A, 106S) is a network element, which, in one embodiment of the invention, may be a switch, a router, a multilayer switch, or any other physical device programmed to implement one or more network communication protocols. In one embodiment of the invention, a network element may be a physical device that includes persistent storage, memory (e.g., random access memory (RAM)), one or more computer processors (e.g., integrated circuits) (including a switch chip), and two or more physical network interfaces or ports. The persistent storage in a network element may include any type of non-transitory computer readable medium that includes instructions, which when executed by the one or more computer processors, enable the network element to perform its respective programmed functionalities. In one embodiment of the invention, the switch chip may be hardware that determines out of which egress port on a network element to forward bridging packets (e.g., media access control (MAC) frames). The switch chip may include egress and ingress ports that may connect to ports on the network element.

In one embodiment of the invention, an MLAG peer (106A, 106S) may be a virtual machine. Broadly speaking, a virtual machine is a distinct operating environment configured to inherit underlying functionality of the host operating system (and access to the underlying host hardware) via an abstraction layer. In such an embodiment, an MLAG peer (106A, 106S), as a virtual machine, may include a separate instance of an operating system, which is distinct from the host operating system. For example, an MLAG peer (106A, 106S) may be implemented on VMware® architectures involving: (i) one or more virtual machines executing on a host computing device (e.g., a host network element) such that each virtual machine serves as host to an instance of a guest operating system; and (ii) a hypervisor layer serving to facilitate intra-host communication between the one or more virtual machines and host computing device hardware. Alternatively, an MLAG peer (106A, 106S) may be implemented on Xen® architectures involving: (i) a control host operating system (e.g., Dom 0) including a hypervisor; and (ii) one or more virtual machines (e.g., Dom U) executing guest operating system instances. The invention is not limited to the aforementioned exemplary architectures. (VMware® is a registered trademark of VMware, Inc. Xen® is a trademark overseen by the Xen Project Advisory Board).

In one embodiment of the invention, each MLAG peer (106A, 106S), at each network interface or port (not shown), may be connected to either an MLAG peer or an ECS (102A, 102B). Ports connected to a MLAG peer may be referred to as peer ports while ports not connected to a MLAG peer may be referred to as non-peer ports. With respect to peer ports, each MLAG peer (106A, 106S) may include one or more peer ports, where the peer ports on one MLAG peer are connected (e.g., via a wired connection or virtual connection) to the peer ports on the other MLAG peer. The result is one or more physical and/or virtual links between the MLAG peers (106A, 106S). These links may be collectively referred to as the MLAG peer link (116).

In one embodiment of the invention, each MLAG peer (106A, 106S) may be configured to receive packets via the non-peer ports and determine whether to (i) drop the packet; (ii) process the packet as part of a layer-2 (L2) control protocol (e.g., spanning tree protocol (STP), link aggregation control protocol (LACP), Internet group management protocol (IGMP)) and/or routing protocol (e.g., open shortest path first (OSPF) protocol, routing information protocol (RIP), etc.); or (iii) send the packet out over another one of the ports on the MLAG peer based on the processing in (ii).

How the MLAG peer (106A, 106S) makes the determination of whether to drop the packet, and/or send the packet to another computing system (e.g., network element, server, etc.) on the network depends, in part, on whether the MLAG peer (106A, 106S) is a layer-2 (L2) switch or a layer-3 (L3) switch (also referred to as a multilayer switch), which may perform at least some functions of a router. If the MLAG peer (106A, 106S) is operating as a L2 switch, the MLAG peer (106A, 106S) uses a destination bridging address (e.g., a destination MAC address) along with a forwarding table or policy to determine out of which port to send the packet. If the MLAG peer (106A, 106S) is operating as a L3 switch, the MLAG peer (106A, 106S) uses a destination routing address (e.g., a destination Internet Protocol (IP) address) along with a routing table to determine out of which port to send the packet, and includes the ability to write the bridging address of the next computing system to receive the packet in place of its own bridging address (which the last computing system to send the packet wrote) in the L2 information encapsulating the packet. If the MLAG peer (106A, 106S) is a multilayer switch, the multilayer switch includes functionality to process packets using both bridging (e.g., MAC) and routing (e.g., IP) addresses.

In one embodiment of the invention, each MLAG peer (106A, 106S) includes a system state database (SSD) (e.g., the active peer SSD (108A), the standby peer SSD (108S)), a STP processor (e.g., the active peer STP processor (110A), the standby peer STP processor (110S)), a MLAG agent (e.g., the active peer MLAG agent (112A), the standby peer MLAG agent (112S)), and a STP transceiver (e.g., the active peer STP transceiver (114A), the standby peer STP transceiver (114S)). Each of these components is described below.

In one embodiment of the invention, a SSD (108A, 108S) may be a data repository. Further, the data repository may be any type of storage unit and/or device (e.g., a file system, a database, a collection of tables, or any other storage mechanism) for storing data. Further, the data repository may include multiple different storage units and/or devices. In one embodiment of the invention, the SSD (108A, 108S) may be implemented using any combination of shared and non-shared memory. In one embodiment of the invention, the SSD (108A, 108S) stores the current state of the MLAG peer (106A, 106S) (e.g., all values in all data structures used by any of the processes executing on the MLAG peer (106A, 106S)). The SSD (108A, 108S) may include the values of all variables and/or parameters that are currently specified in the MLAG peer (106A, 106S). In one embodiment of the invention, the SSD (108A, 108S) stores the aforementioned information in records within the SSD (108A, 108S). The specific content of the records in the SSD may vary based on the implementation of the invention. Accordingly, a record within the SSD (108A, 108S) may include all, some, or none of the following: (i) the name of the variable (or name of the parameter); (ii) the current value of the variable (or parameter); and (iii) a timestamp indicating when the record was created (or last modified). Additionally, the SSD (108A, 108S) may store other and/or different information about the current and/or historical state of the MLAG peer (106A, 106S) without departing from the scope of the invention. Further, while the SSD (108A, 108S) shown in each MLAG peer (106A, 106S) in FIG. 1 is shown as a single entity, in other embodiments of the invention, various portions of the SSD (108A, 108S) may be stored in different locations within the MLAG peer (106A, 106S).

In one embodiment of the invention, the state information stored in the SSD (108A, 108S) may include current and/or historical STP state. STP is a network protocol that maintains a logical loop-free network topology amongst interconnected network elements. Specifically, the STP prevents the circulation of packets broadcasted around looped paths in a redundant network, which may saturate the network and consume all available bandwidth. More specifically, the STP ensures that only one active path exists between any given pair of network elements. In implementing the STP, network elements within a redundant network regularly exchange bridge protocol data units (BPDUs) between one another, thus enabling each of the network elements to track network changes and to determine which ports to disable in view of the network changes to maintain the logical loop-free network topology.

In one embodiment of the invention, STP state may include a spanning (or inverted) tree representative of the redundant network as a logical loop-free network topology. The spanning tree may be collectively computed by the network elements of the redundant network. In brief, computation of the spanning tree may entail: (i) the selection of a root bridge or root network element; (ii) the determination of least cost paths to the root bridge or root network element; (iii) the disabling of ports connected to all other paths; and (iv) the computing of network topology changes. A root bridge may be the network element with the smallest (or lowest) bridge ID, which is obtained through concatenation of a 2-byte priority for the network element and a 6-byte MAC address associated with the network element. Thus, BPDUs, in one embodiment of the invention, STP state may further include path and priority information (e.g., network element priority and MAC address) pertinent to identifying the root bridge and the paths to the root bridge, which is necessary for the calculation of the spanning tree.

In one embodiment of the invention, the state information stored in the SSD (108A, 108S) may further include current values pertaining to one or more BPDU duplicate counters (BDCs). In one embodiment of the invention, a BDC may serve to track duplicate BPDUs received from different network elements by a given network element of the redundant network. Though, conventionally, these duplicate BPDUs may be dropped and/or ignored by a network element implementing the STP, in one embodiment of the invention, a BDC may be used by a network element (or more specifically, the STP processor (110A, 110S) executing on an MLAG peer (106A, 106S)) to refresh the retention period of STP state stored in the SSD (108A, 108S) (discussed below). The SSD (108A, 108S) may include additional state information without departing from the scope of the invention.

In one embodiment of the invention, a STP processor (110A, 110S) may be hardware, software, firmware, or any combination thereof that includes functionality to process STP state towards calculating the spanning tree as mentioned above. For example, in one embodiment of the invention, the STP processor (110A, 110S) may be an application-specific integrated circuit (ASIC) programmed to specifically process STP state in accordance with the STP network protocol and/or embodiments of the invention (see e.g., FIGS. 2A-3C). In another embodiment of the invention, the STP processor (110A, 110S) may be one or more processes executing on one or more generic computer processors residing on an MLAG peer (106A, 106S). In one embodiment of the invention, the STP processor (110A, 110S) may include further functionality to access various portions of the SSD (108A, 108S) in order to obtain relevant portions of the state (e.g., STP state, BDCs, etc.) of the MLAG peer (106A, 106S) to carry out the computation of the spanning tree. Subsequently, the STP processor (110A, 110S) may include functionality to store new STP state, resulting from the processing of STP state derived from received BPDUs, in the SSD (108A, 108S); and use a BDC (discussed above) to refresh a retention period for STP state stored in the SSD (108A, 108S).

In one embodiment of the invention, a MLAG agent (112A, 112S) may be one or more processes that execute on the one or more computer processors of a MLAG peer (106A, 106S). Particularly, the MLAG agent (112A, 112S) may be one or more processes that include the functionality to implement the above-mentioned MLAG network element behavior. Subsequently, the MLAG agent (112A, 112S) may include functionality to share state information (e.g., STP state, BDC values, etc.) with a counterpart MLAG agent (112A, 112S) executing on another MLAG peer (106A, 106S) in the MLAG domain (104). In one embodiment of the invention, this sharing of state information is achievable via the transmission and/or reception of state information using the MLAG peer link (116) between the two MLAG peers (106A, 106S). In one embodiment of the invention, the MLAG agent (112A, 112S) includes further functionality to access various portions of the SSD (108A, 108S) in order to obtain relevant portions of the state of the MLAG peer (106A, 106S) to share with a counterpart MLAG agent (112A, 112S) executing on another MLAG peer (106A, 106S). Further, the MLAG agent (112A, 112S) includes functionality to store any state information (e.g., STP state, BDC values, etc.) received via the MLAG peer link (116) in the SSD (108A, 108S).

In one embodiment of the invention, the MLAG agent (112A, 112S) may not be implemented. In such an embodiment, the above mentioned functionalities of the MLAG agent (112A, 112S) may be subsumed by any other process executing on an MLAG peer (106A, 106S). For example, in one embodiment of the invention, the active peer STP transceiver (114A) (described below) on the active MLAG peer (106A) may directly communicate, and thus exchange state information, with the standby peer STP transceiver (114S) on the standby MLAG peer (106S). The exchange of state information may or may not be carried over by a peer link (e.g., a LAG, MLAG, or any other peer link).

In one embodiment of the invention, a STP transceiver (114A, 114S) may be hardware, software, firmware, or any combination thereof that includes functionality to handle BPDUs. For example, the STP transceiver (114A, 114S) may be implemented as one or more application-specific integrated circuits (ASICs) or any other type of integrated circuit. Alternatively, the STP transceiver (114A, 114S) may be implemented as one or more processes executing on generic computer processors on an MLAG peer (106A, 106S). In one embodiment of the invention, the STP transceiver (114A, 114S) may include functionality to transmit and receive BPDUs to/from an ECS (102A, 102B). The STP transceiver (114A, 114S) may include further functionality to derive STP state from and/or using BPDUs that have been received from an ECS (102A, 102B). As discussed above, a BPDU may include STP state in the form of path and priority information (e.g., network element priority and MAC address) pertinent to identifying the root bridge and the paths to the root bridge, which is necessary for the calculation of the spanning tree used in the STP. Additionally, the STP transceiver (114A, 114S) may include functionality to generate BPDUs using STP state obtained from the SSD (108A, 108S). Accordingly, the STP transceiver (114A, 114S) includes functionality to access various portions of the SSD (108A, 108S) in order to obtain relevant portions of the state of a MLAG peer (106A, 106S) to generate and/or transmit BPDUs; and to store STP state derived from received BPDUs in the SSD (108A, 108S).

In one embodiment of the invention, an external computing system (ECS) (102A, 102B) may be any computing system (see e.g., FIGS. 5A and 5B) that includes functionality to communicate (e.g., send and receive packets) with the MLAG domain (104). In one embodiment of the invention, an ECS (102A, 102B) includes functionality to transmit and/or receive BPDUs to a MLAG peer (106A, 106S). Examples of an ECS (102A, 102B) include, but are not limited to, a network element, a host/server, a virtual machine, a client device associated with an end user, or any other computing system capable of connecting to at least one port in the MLAG domain (104).

In one embodiment of the invention, an ECS (102A, 102B) may be a singly-connected or a dually-connected computing system. A singly-connected computing system is only connected to a single port on one of the MLAG peers (106A, 106S). A dually-connected computing system is connected to at least one port on each of the MLAG peers (106A, 106S) in the MLAG domain (104). If an ECS (102A, 102B) is dually-connected, then the ports on the ECS (102A, 102B) that are connected to the MLAG domain (104) (which designate the ECS as a dually-connected computing system) are collectively referred to as a link aggregation group (LAG).

In one embodiment of the invention, in order to behave (or at least appear to ECSs (102A, 102B) that are dually-connected) as a single network element, the MLAG domain (104) implements the following functionality: (i) one MLAG peer (e.g., the active MLAG peer (106A)) is designated as a primary network element while the other MLAG peer (e.g., the standby MLAG peer (106S)) is designated as a secondary network element; (ii) the primary network element is responsible for calculating the spanning tree used by the STP for the MLAG domain (104) and thus includes a primary STP processor (e.g., the active peer STP processor (110A)), whereas the secondary network element includes a non-active (or secondary) STP processor (e.g., the standby peer STP processor (110S)), which remains dormant until the primary network element experiences a failover; (iii) both primary and secondary network elements include active-active STP transceivers (114A, 114S) that receive BPDUs from an ECS (102A, 102B) and subsequently generate and transmit new BPDUs to another ECS (102A, 102B); and (iv) both primary and secondary network elements share forwarding table information via the MLAG peer link (116) such that the MLAG peers (106A, 106S) have synchronized forwarding tables. Further, in one embodiment of the invention, both MLAG peers maintain synchronized SSDs (108A, 108S) through the exchange of state information changes across the MLAG peer link (116).

The invention is not limited to the system configuration shown in FIG. 1.

FIGS. 2A-3C show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 2A-3C may be performed in parallel with any other steps shown in FIGS. 2A-3C without departing from the invention.

Figure 2A:
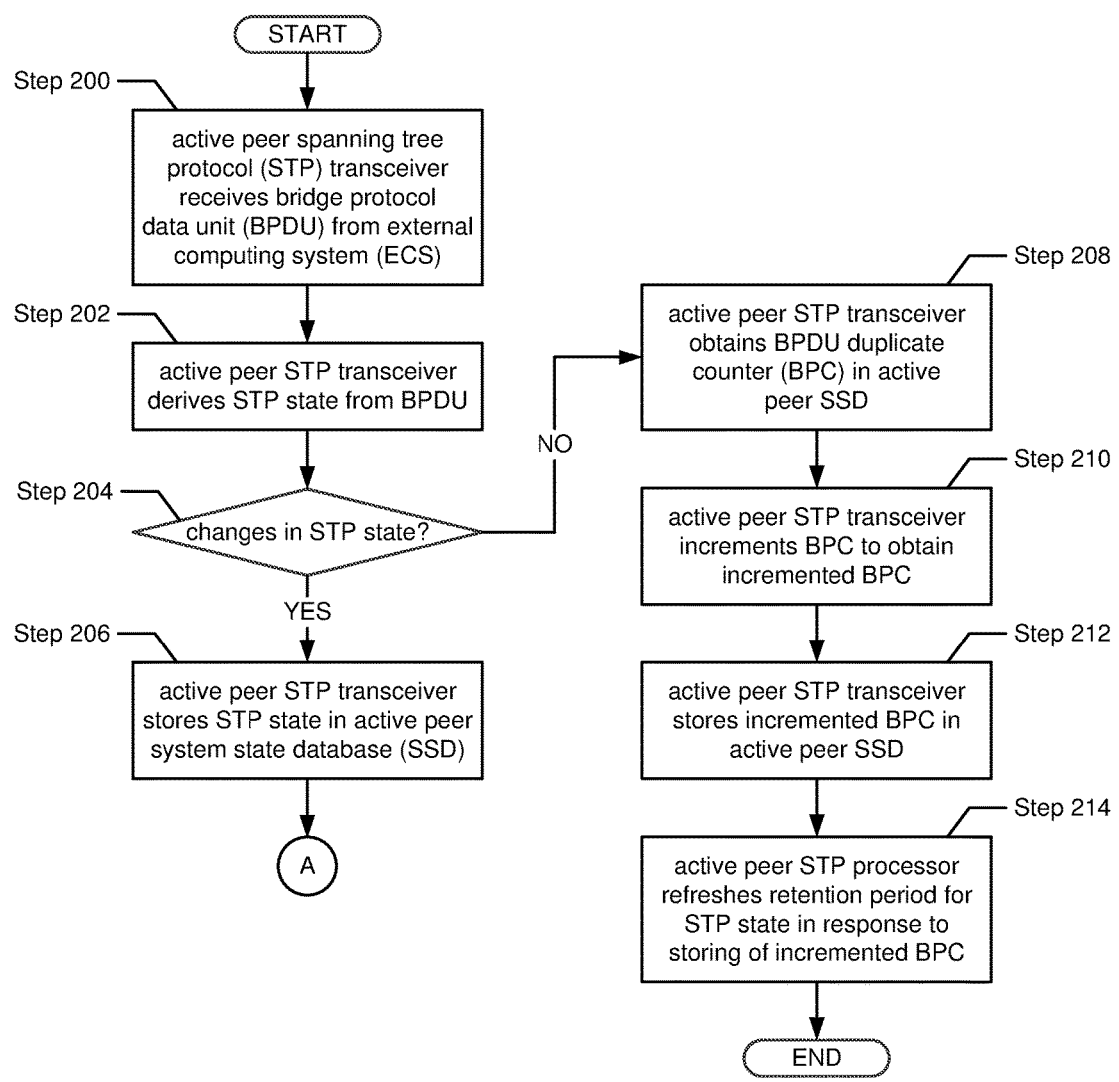
FIGS. 2A-2E show flowcharts describing methods performed from the perspective of an active MLAG peer in accordance with one or more embodiments of the invention.
Figure 2B:
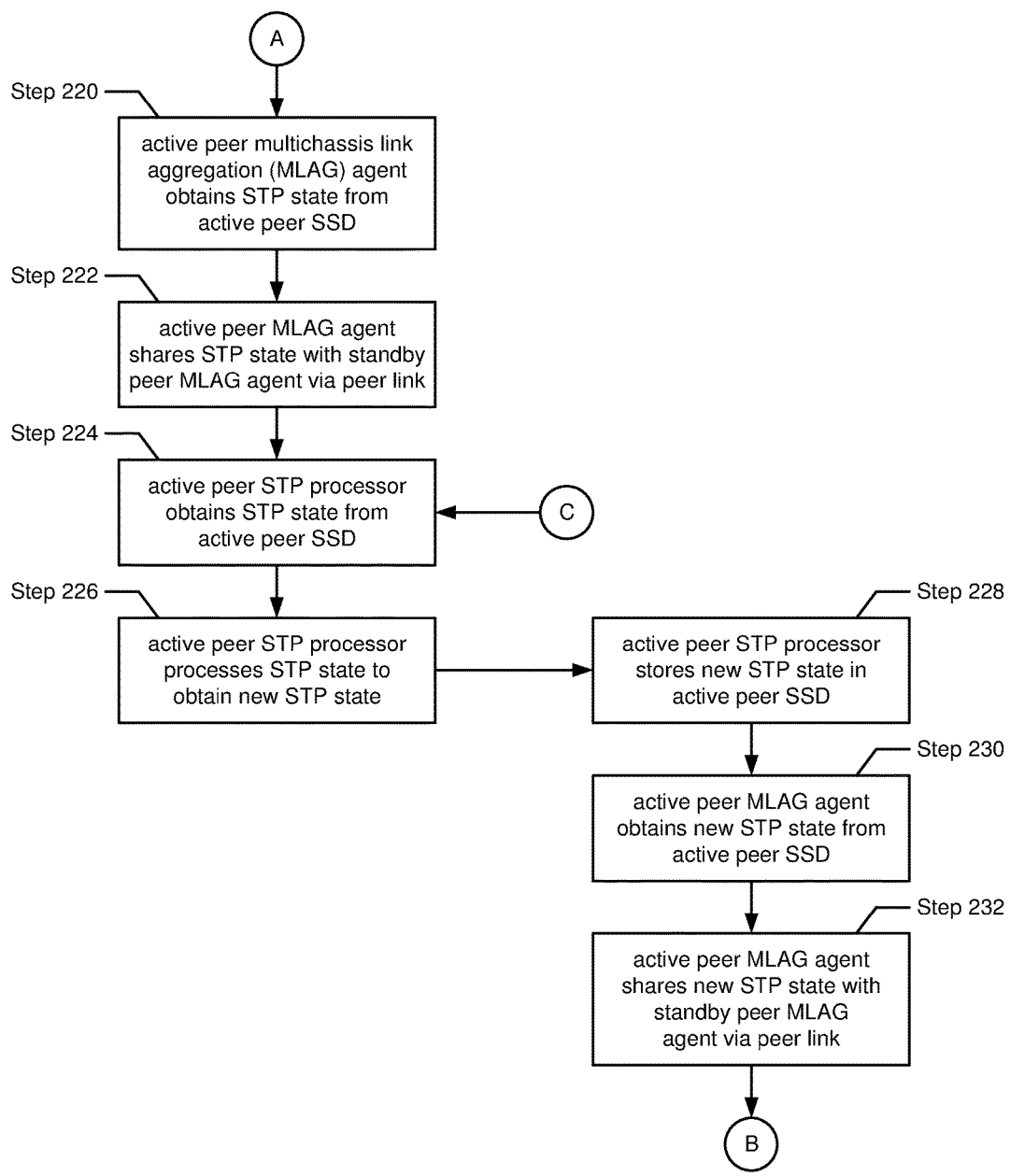
Figure 2C:
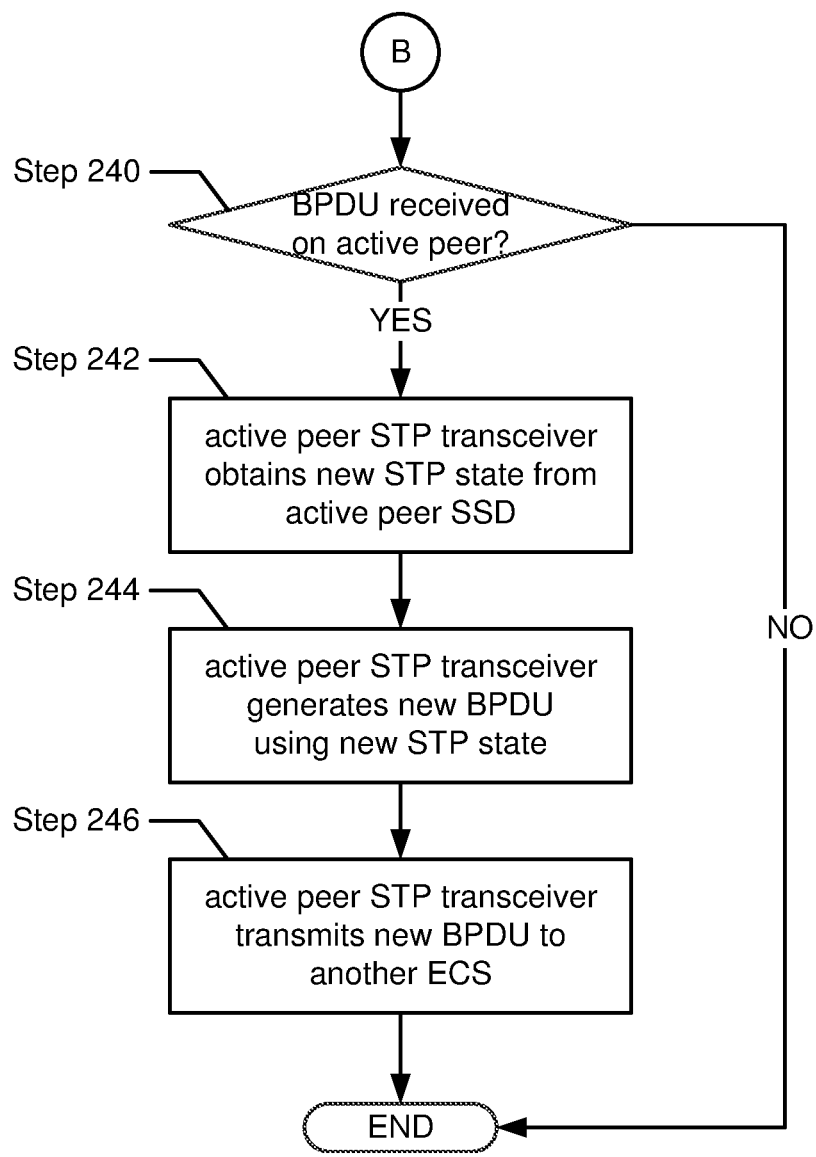

FIGS. 2A-2E show flowcharts describing methods performed by an active MLAG peer (see e.g., 106A in FIG. 1). More specifically, FIGS. 2A-2C show flowcharts describing a method for the handling of BPDUs by the active MLAG peer in accordance with one or more embodiments of the invention. In Step 200, the active peer STP transceiver receives a BPDU from an ECS. In one embodiment of the invention, the ECS may transmit the BPDU towards the MLAG domain, which the ECS views as a single network element. Subsequently, in one embodiment of the invention, the BPDU may arrive at a port on the active MLAG peer. Alternatively, in another embodiment of the invention, the BPDU may arrive at a port on the standby MLAG peer (see e.g., FIGS. 3A-3C for the handling of BPDUs when received by the standby MLAG peer). Alternatively, in still another embodiment of the invention, the BPDU may arrive at a respective port at both the active MLAG peer and the standby MLAG peer concurrently.

In Step 202, the active peer STP transceiver derives STP state from and/or using the received BPDU. As discussed above, a BPDU may include STP state in the form of path and priority information (e.g., network element priority and MAC address) pertinent to identifying the root bridge and the paths to the root bridge, which is necessary for the calculation of the spanning tree used in the STP. In one embodiment of the invention, derivation of the STP state may involve decapsulating the BPDU to obtain the path and priority information embedded within the BPDU.

In Step 204, a determination is made as to whether changes are present in the derived STP state. In one embodiment of the invention, the active peer STP transceiver may perform this determination by comparing the STP state (derived in Step 202) with STP state (e.g., a previous STP state) currently stored in the active peer SSD. If it is determined, based on the comparison, that there are changes in the STP state, the process proceeds to Step 206. On the other hand, if it is determined, based on the comparison, that there are no changes in the STP state, the process proceeds to Step 208.

In Step 206, in determining that changes are present in the STP state, the active peer STP transceiver stores the STP state (derived from/using the received BPDU) in the active peer SSD. In one embodiment of the invention, storing of the STP state may involve replacing the previous STP state (stored in the active peer SSD) with the STP state derived in Step 202.

In Step 208, in determining that no changes are present in the STP state, the active peer STP transceiver obtains a currently stored BPDU duplicate counter (BDC) value from the active peer SSD. As discussed above, in one embodiment of the invention, the BDC tracks duplicate BPDUs received by the MLAG domain. In Step 210, the active peer STP transceiver increments the BDC value (obtained in Step 208) to obtain an incremented BDC value. In Step 212, the active peer STP transceiver subsequently stores the incremented BDC value in the active peer SSD. In one embodiment of the invention, storing of the incremented BDC may involve replacing the previous BDC value with the incremented BDC value.

In Step 214, the active peer STP processor (see e.g., 110A in FIG. 1), in response to the storing of the incremented BDC, refreshes a retention period for the STP state stored in the active peer SSD. In one embodiment of the invention, the retention period may specify a duration of time (e.g., a life cycle) for which the STP state is retained by the MLAG domain. In one embodiment of the invention, without the refreshing of the retention period, the retention period may elapse. In response to the elapsing of the retention period, the stored STP state may be designated stale and subsequently discarded. The duration of time specified as the retention period may be representative of any granularity of time.

Turning to FIG. 2B, in Step 220, after the storing of the STP state (based on the presence of changes in the STP state) in the active peer SSD (see e.g., Step 206), the active peer MLAG agent obtains the STP state from the active peer SSD. In one embodiment of the invention, the active peer MLAG agent obtains the STP state in response to a pull mechanism. In another embodiment of the invention, the active peer MLAG agent obtains the STP state in response to a push mechanism.

In Step 222, the active peer MLAG agent shares the STP state (obtained in Step 220) with the standby MLAG peer. Specifically, the active peer MLAG agent transmits the STP state to the standby peer MLAG agent (executing on the standby MLAG peer) via the MLAG peer link. More specifically, in one embodiment of the invention, only changes in the STP state are transmitted across the MLAG peer link. As discussed above, the sharing of STP state enables the MLAG peers to synchronize their respective SSDs. The redundancy of state information in the active and standby peer SSDs guarantees little to no service interruption during the advent of failover on one of the MLAG peers.

In Step 224, the active peer STP processor obtains the STP state from the active peer SSD. In one embodiment of the invention, as shown in FIG. 2B, Step 224 may occur sequentially after the MLAG agent obtains the STP state. In another embodiment of the invention, Step 224 may occur in parallel with Step 220, in which the active peer STP processor and the active peer MLAG agent obtain the STP state concurrently. In one embodiment of the invention, the active peer STP processor obtains the STP state in response to a pull mechanism. In another embodiment of the invention, the active peer STP processor obtains the STP state in response to a push mechanism.

In Step 226, the active peer STP processor processes the STP state to obtain new STP state. In one embodiment of the invention, processing of the STP state may involve using the STP state to calculate and/or update the spanning tree used in the implementation of the spanning tree protocol (STP). In brief, computation of the spanning tree may entail, for example: (i) the selection of a root bridge or root network element; (ii) the determination of least cost paths to the root bridge or root network element; (iii) the disabling of ports connected to all other paths; and (iv) the computing of network topology changes. One of ordinary skill in the relevant art would recognize that additional and/or alternative steps may take place in the calculation of the spanning tree without departing from the scope of the invention. In one embodiment of the invention, the new STP state may be representative of path and priority information (e.g., network element priority and MAC address) derived from the calculating/updating of the spanning tree.

In Step 228, the active peer STP processor stores the new STP state (obtained in Step 226) in the active peer SSD. In Step 230, the active peer MLAG agent obtains the new STP state from the active peer SSD. Similar to Step 220, in one embodiment of the invention, the active peer MLAG agent obtains the new STP state either through a pull or a push mechanism. In Step 232, the active peer MLAG agent shares the new STP state with the standby MLAG agent (executing on the standby MLAG peer) via the MLAG peer link.

Turning to FIG. 2C, following Step 232, a determination is made, in Step 240, as to whether the BPDU was received by the active MLAG peer. If it is determined that the BPDU (from which STP state was derived) was received by the active MLAG peer (or more specifically, the active peer STP transceiver), the process proceeds to Step 242. On the other hand, if it is determined that the BPDU (from which STP state was derived) was received by the standby MLAG peer (or more specifically, the standby peer STP transceiver) (see e.g., FIGS. 3A and 3B), the process ends.

In Step 242, in determining that the BPDU (from which STP state was derived) was received by the active MLAG peer, the active peer STP transceiver obtains the new state from the active peer SSD. In one embodiment of the invention, the active peer STP transceiver obtains the new STP state in response to a pull mechanism. In another embodiment of the invention, the active peer STP transceiver obtains the new STP state in response to a push mechanism.

In Step 244, the active peer STP transceiver generates a new BPDU using the new STP state (obtained in Step 242). In one embodiment of the invention, generation of the new BPDU may involve generating a media access control (MAC) frame, wherein the payload of the MAC frame includes BPDU-format pertinent information. BPDU-format pertinent information (e.g., fields within a BPDU) may include, but is not limited to, a protocol identifier, a protocol version, a message type, one or more flags, a root bridge identifier, one or more root path costs, a network element identifier, a port identifier, a message age, a maximum age, a hello time, and a forward delay. In Step 246, the active peer STP transceiver transmits the new BPDU (generated in Step 244) to another ECS. In one embodiment of the invention, the new BPDU may subsequently be transmitted periodically. The periodicity of the transmission of the new BPDU may be specified in context included within the new STP state.

Figure 2E:
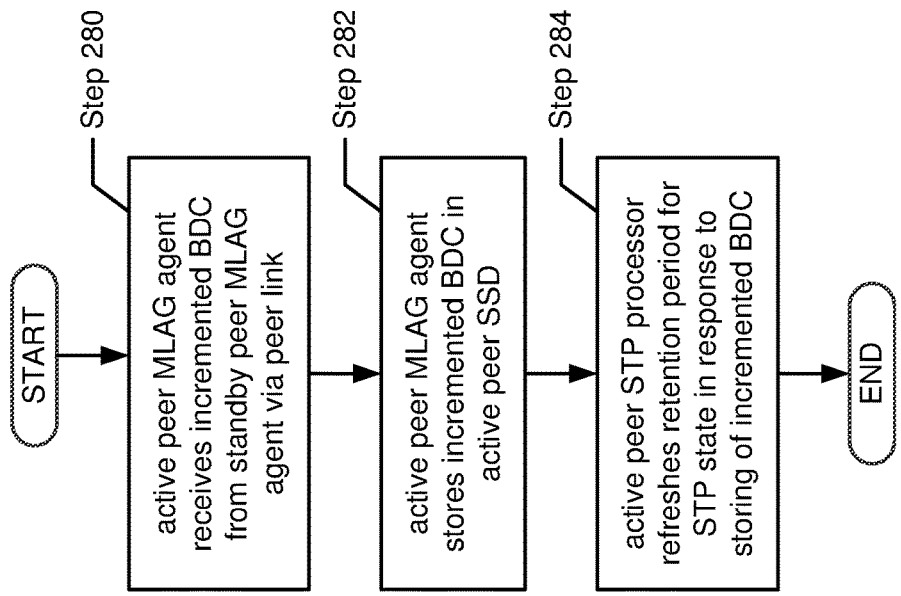
Figure 2D:
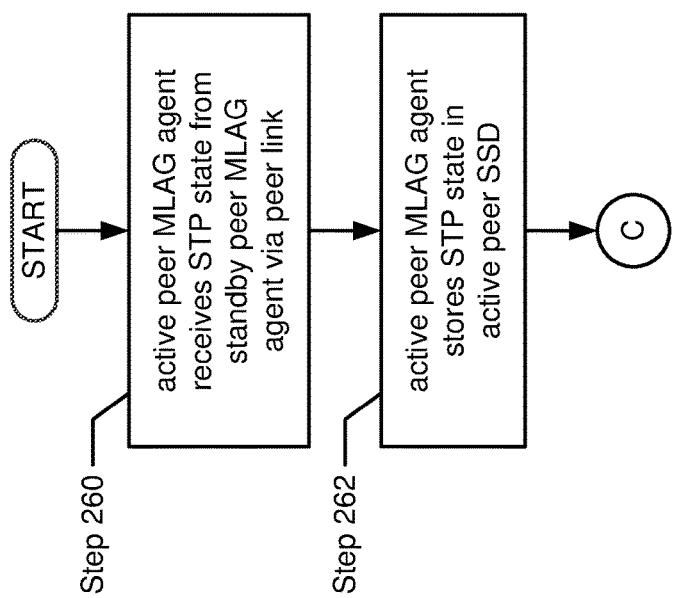

FIG. 2D shows a flowchart describing a method for synchronizing STP state in accordance with one or more embodiments of the invention. In Step 260, the active peer MLAG agent receives STP state from the standby MLAG peer. More specifically, the active peer MLAG agent receives STP state from the standby peer MLAG agent (executing on the standby MLAG peer) via the MLAG peer link. In one embodiment of the invention, the standby peer MLAG agent may share (or synchronize) STP state with the active MLAG peer when: (i) it has been determined that there are changes in the STP state derived from BPDUs obtained by the standby MLAG peer (see e.g., FIGS. 3A and 3B); and (ii) STP state derived at the standby MLAG peer needs processing by the active peer STP processor.

In Step 262, the active peer MLAG agent stores the STP state (obtained in Step 260) in the active peer SSD. In one embodiment of the invention, storing of the STP state may involve replacing the currently/previously stored STP state in the SSD with the STP state received in Step 260. From here, the process may proceed to Step 224 (discussion above), whereupon the STP state is subsequently obtained by the active peer STP processor for processing.

FIG. 2E shows a flowchart describing a method for refreshing the STP state retention period in accordance with one or more embodiments of the invention. In Step 280, the active peer MLAG agent receives an incremented BDC value. More specifically, the active peer MLAG agent receives the incremented BDC value from the standby peer MLAG agent via the MLAG peer link. In one embodiment of the invention, a BDC value (retrieved at the standby MLAG peer) may be incremented to obtain the incremented BDC value in response to the standby MLAG peer receiving a duplicate BPDU. The incremented BDC value traverses the MLAG peer link from the standby MLAG peer to the active MLAG peer in order to synchronize the state information stored amongst both the active peer SSD and the standby peer SSD.

In Step 282, the active peer MLAG agent stores the incremented BDC value (obtained in Step 280) in the active peer SSD. In response to storing the incremented BDC value, in Step 284, the active peer STP processor subsequently refreshes the retention period for the STP state stored in the active peer SSD. In one embodiment of the invention, the retention period may specify a duration of time (e.g., a life cycle) for which the STP state is retained by the MLAG domain. In one embodiment of the invention, without the refreshing of the retention period, the retention period may elapse. In response to the elapsing of the retention period, the stored STP state may be designated stale and subsequently discarded. The duration of time specified as the retention period may be representative of any granularity of time.

Figure 3A:
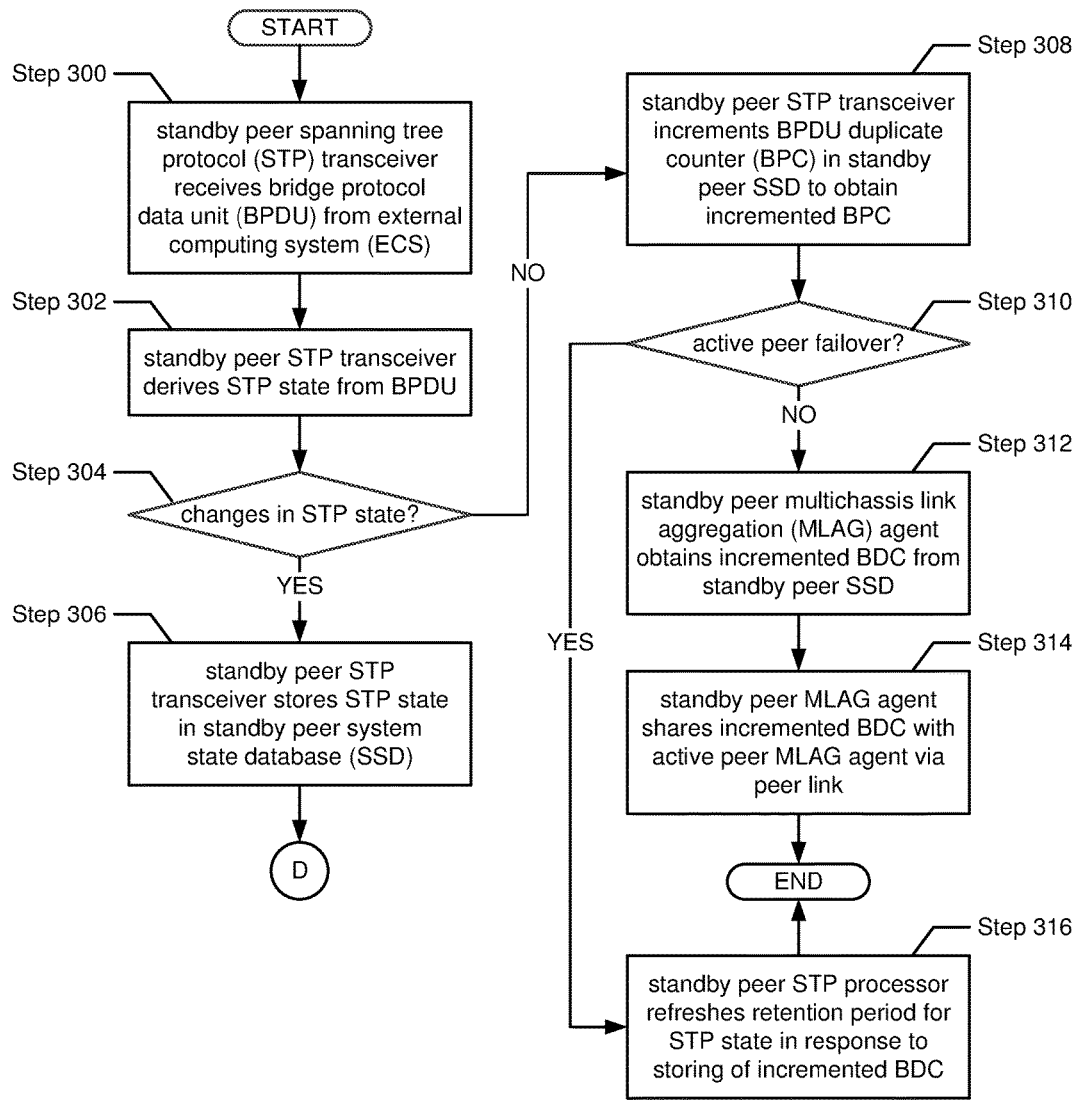
FIGS. 3A-3C show flowcharts describing methods performed from the perspective of a standby MLAG peer in accordance with one or more embodiments of the invention.
Figure 3B:
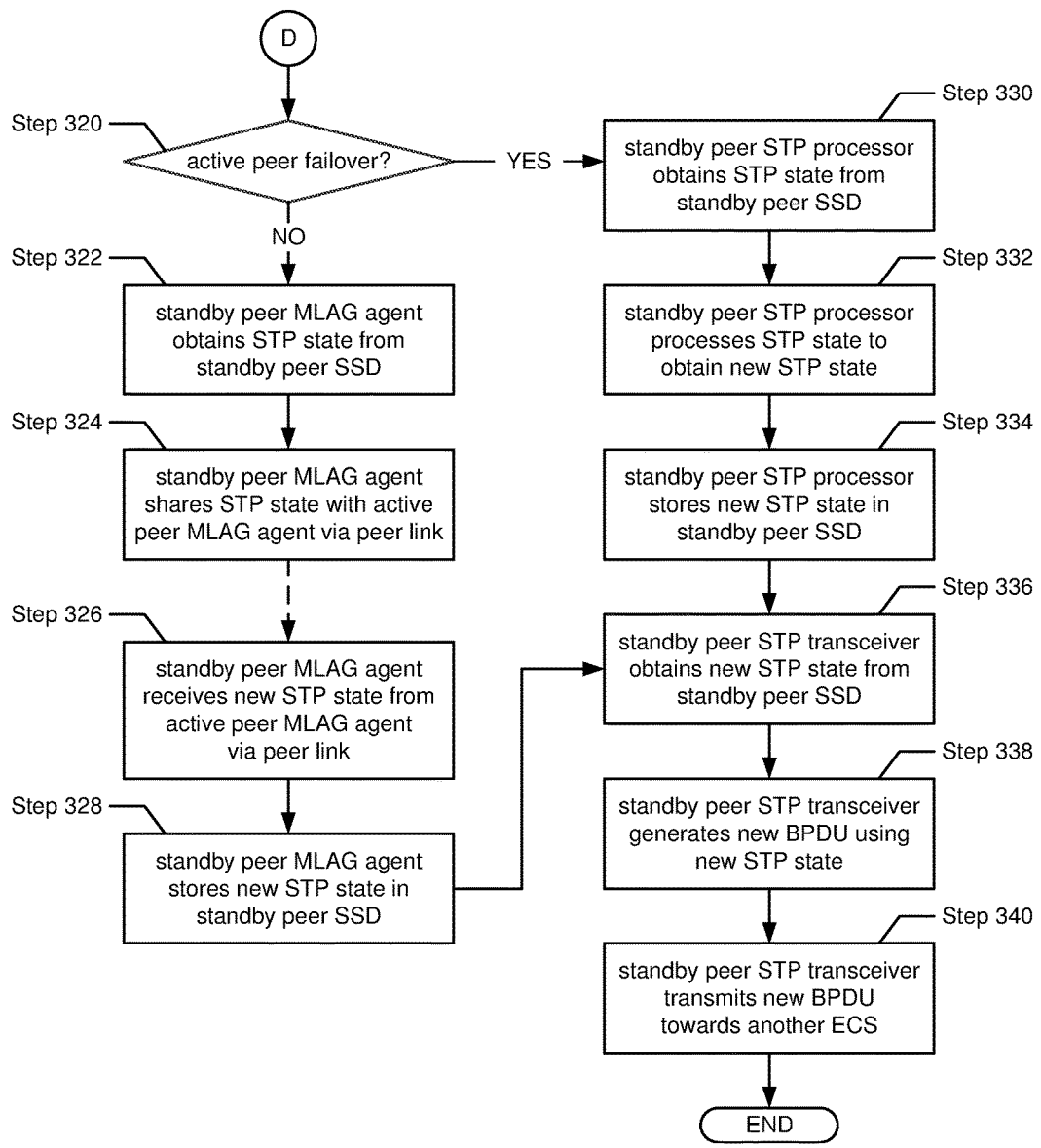
Figure 3C:
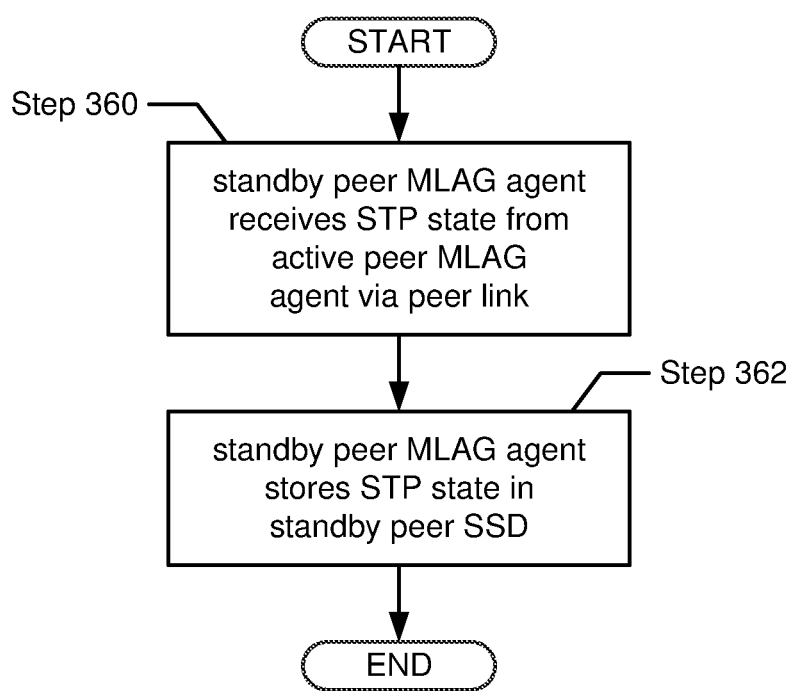

FIGS. 3A-3C show flowcharts describing methods performed by a standby MLAG peer (see e.g., 106S in FIG. 1). More specifically, FIGS. 3A and 3B show flowcharts describing a method for the handling of BPDUs by the standby MLAG peer in accordance with one or more embodiments of the invention. In Step 300, the standby peer STP transceiver receives a BPDU from an ECS. In one embodiment of the invention, the ECS may transmit the BPDU towards the MLAG domain, which the ECS views as a single network element. Subsequently, in one embodiment of the invention, the BPDU may arrive at a port on the active MLAG peer (see e.g., FIGS. 2A-2C for the handling of BPDUs when received by the active MLAG peer). Alternatively, in another embodiment of the invention, the BPDU may arrive at a port on the standby MLAG peer. Alternatively, in yet another embodiment of the invention, the BPDU may arrive at a respective port on the active MLAG peer and the standby MLAG peer concurrently.

In Step 302, the standby peer STP transceiver derives STP state from and/or using the received BPDU. As discussed above, a BPDU may include STP state in the form of path and priority information (e.g., network element priority and MAC address) pertinent to identifying the root bridge and the paths to the root bridge, which is necessary for the calculation of the spanning tree used in the STP. In one embodiment of the invention, derivation of the STP state may involve decapsulating the BPDU to obtain the path and priority information embedded within the BPDU.

In Step 304, a determination is made as to whether changes are present in the derived STP state. In one embodiment of the invention, the standby peer STP transceiver may perform this determination by comparing the STP state (derived in Step 302) with STP state (e.g., a previous STP state) currently stored in the standby peer SSD. If it is determined, based on the comparison, that there are changes in the STP state, the process proceeds to Step 306. On the other hand, if it is determined, based on the comparison, that there are no changes in the STP state, the process proceeds to Step 308.

In Step 306, in determining that changes are present in the STP state, the standby peer STP transceiver stores the STP state (derived from/using the received BPDU) in the standby peer SSD. In one embodiment of the invention, storing of the STP state may involve replacing the previous STP state (stored in the standby peer SSD) with the STP state derived in Step 302.

In Step 308, in determining that no changes are present in the STP state, the standby peer STP transceiver obtains a currently stored BPDU duplicate counter (BDC) value from the standby peer SSD. As discussed above, in one embodiment of the invention, the BDC tracks duplicate BPDUs received by the MLAG domain. Next, the standby peer STP transceiver increments the BDC value to obtain an incremented BDC value. Subsequently, the standby peer STP transceiver stores the incremented BDC value in the standby peer SSD. In one embodiment of the invention, storing of the incremented BDC may involve replacing the previous BDC value with the incremented BDC value.

In Step 310, another determination is made as to whether, at this point, the active MLAG peer has undergone failover. If it is determined that the active MLAG peer has experienced failover (e.g., the standby peer STP processor has awaken from its dormant state to an active state), the process proceeds to Step 316. On the other hand, if it is determined that the active MLAG peer has yet to experience failover, the process proceeds to Step 312.

In Step 312, in determining that the active MLAG peer has yet to experience failover, the standby peer MLAG agent obtains the incremented BDC value from the standby peer SSD, which was stored therein in Step 308. In one embodiment of the invention, the standby peer MLAG agent obtains the incremented BDC value in response to a pull mechanism. In another embodiment of the invention, the standby peer MLAG agent obtains the incremented BDC value in response to a push mechanism.

In Step 314, the standby peer MLAG agent shares the incremented BDC value with the active MLAG peer. More specifically, the standby peer MLAG agent transmits the incremented BDC value to the active peer MLAG agent (executing on the active MLAG peer) via the MLAG peer link. The active MLAG peer subsequently performs the steps outlined in FIG. 2E in accordance with one or more embodiments of the invention.

In Step 316, in determining that the active MLAG peer has experienced failover (see e.g., Step 310), the standby peer STP processor (see e.g., 110S in FIG. 1), in response to the storing of the incremented BDC, refreshes a retention period for the STP state stored in the standby peer SSD. In one embodiment of the invention, the retention period may specify a duration of time (e.g., a life cycle) for which the STP state is retained by the MLAG domain. In one embodiment of the invention, without the refreshing of the retention period, the retention period may elapse. In response to the elapsing of the retention period, the stored STP state may be designated stale and subsequently discarded. The duration of time specified as the retention period may be representative of any granularity of time.

Turning to FIG. 3B, after the storing of the STP state (in Step 306), another determination is made as to whether the active MLAG peer has undergone failover in Step 320. If it is determined that the active MLAG peer has indeed experienced failover, then the process proceeds to Step 330. On the other hand, if it is determined that the active MLAG peer has yet to experience failover, then the process proceeds to Step 322.

In Step 322, in determining (in Step 320) that the active MLAG peer has yet to experience failover, the standby peer MLAG agent obtains the STP state from the standby peer SSD. In one embodiment of the invention, the standby peer MLAG agent obtains the STP state in response to a pull mechanism. In another embodiment of the invention, the standby peer MLAG agent obtains the STP state in response to a push mechanism.

In Step 324, the standby peer MLAG agent shares the STP state (obtained in Step 322) with the active MLAG peer. Specifically, the standby peer MLAG agent transmits the STP state to the active peer MLAG agent (executing on the active MLAG peer) via the MLAG peer link. More specifically, in one embodiment of the invention, only changes in the STP state are transmitted across the MLAG peer link. As discussed above, the sharing of STP state enables the MLAG peers to synchronize their respective SSDs. The redundancy of state information in the active and standby peer SSDs guarantees little to no service interruption during the advent of failover on one of the MLAG peers.

Between Steps 324 and 326, the active MLAG peer may perform the steps outlined in FIGS. 2B-2D in accordance with one or more embodiments of the invention.

In Step 326, the standby peer MLAG agent receives new STP state from the active MLAG peer. Particularly, the standby peer MLAG agent receives new STP state from the active peer MLAG agent (executing on the active MLAG peer) via the MLAG peer link. Subsequently, in Step 328, the standby peer MLAG agent stores the new STP state (obtained in Step 326) in the standby peer SSD.

In Step 330, in determining (in Step 320) that the active MLAG peer has experienced failover, the standby peer STP processor obtains the STP state (stored by the standby peer MLAG agent) from the standby peer SSD. In one embodiment of the invention, in response to the active MLAG peer experiencing failover, the standby peer STP processor awakens from its dormant state and resumes the responsibility of calculating/updating the spanning tree for implementing the STP for the MLAG domain. In one embodiment of the invention, the standby peer STP processor obtains the STP state in response to a pull mechanism. In another embodiment of the invention, the standby peer STP processor obtains the STP state in response to a push mechanism.

In Step 332, the standby peer STP processor processes the STP state to obtain new STP state. In one embodiment of the invention, processing of the STP state may involve using the STP state to calculate and/or update the spanning tree used in the implementation of the spanning tree protocol (STP). In brief, computation of the spanning tree may entail: (i) the selection of a root bridge or root network element; (ii) the determination of least cost paths to the root bridge or root network element; and (iii) the disabling of ports connected to all other paths. One of ordinary skill in the relevant art would recognize that additional and/or alternative steps may take place in the calculation of the spanning tree without departing from the scope of the invention. In one embodiment of the invention, the new STP state may be representative of path and priority information (e.g., network element priority and MAC address) derived from the calculating/updating of the spanning tree.

In Step 334, the standby peer STP processor stores the new STP state (obtained in Step 332) in the standby peer SSD. After (i) the standby peer STP processor (see e.g., Step 334) or (ii) the standby peer MLAG agent (see e.g., Step 328) stores the new STP state, in Step 336, the standby peer STP transceiver obtains the new state from the standby peer SSD. In one embodiment of the invention, the standby peer STP transceiver obtains the new STP state in response to a pull mechanism. In another embodiment of the invention, the standby peer STP transceiver obtains the new STP state in response to a push mechanism.

In Step 338, the standby peer STP transceiver generates a new BPDU using the new STP state (obtained in Step 336). In one embodiment of the invention, generation of the new BPDU may involve generating a media access control (MAC) frame, wherein the payload of the MAC frame includes BPDU-format pertinent information. BPDU-format pertinent information (e.g., fields within a BPDU) may include, but is not limited to, a protocol identifier, a protocol version, a message type, one or more flags, a root bridge identifier, one or more root path costs, a network element identifier, a port identifier, a message age, a maximum age, a hello time, and a forward delay. In Step 340, the standby peer STP transceiver transmits the new BPDU (generated in Step 338) to another ECS. In one embodiment of the invention, the new BPDU may subsequently be transmitted periodically. The periodicity of the transmission of the new BPDU may be specified in context included within the new STP state.

FIG. 3C shows a flowchart describing a method for synchronizing STP state in accordance with one or more embodiments of the invention. In Step 360, the standby peer MLAG agent receives STP state from the active MLAG peer. More specifically, the standby peer MLAG agent receives STP state from the active peer MLAG agent (executing on the active MLAG peer) via the MLAG peer link. In one embodiment of the invention, the active peer MLAG agent may share (or synchronize) STP state with the standby MLAG peer when changes in STP state derived from BPDUs obtained by the active MLAG peer have been affirmed (see e.g., FIGS. 2A-2C).

In Step 362, the standby peer MLAG agent stores the STP state (obtained in Step 360) in the standby peer SSD. In one embodiment of the invention, storing of the STP state may involve replacing the currently/previously stored STP state in the SSD with the STP state received in Step 360.

Figure 4A:
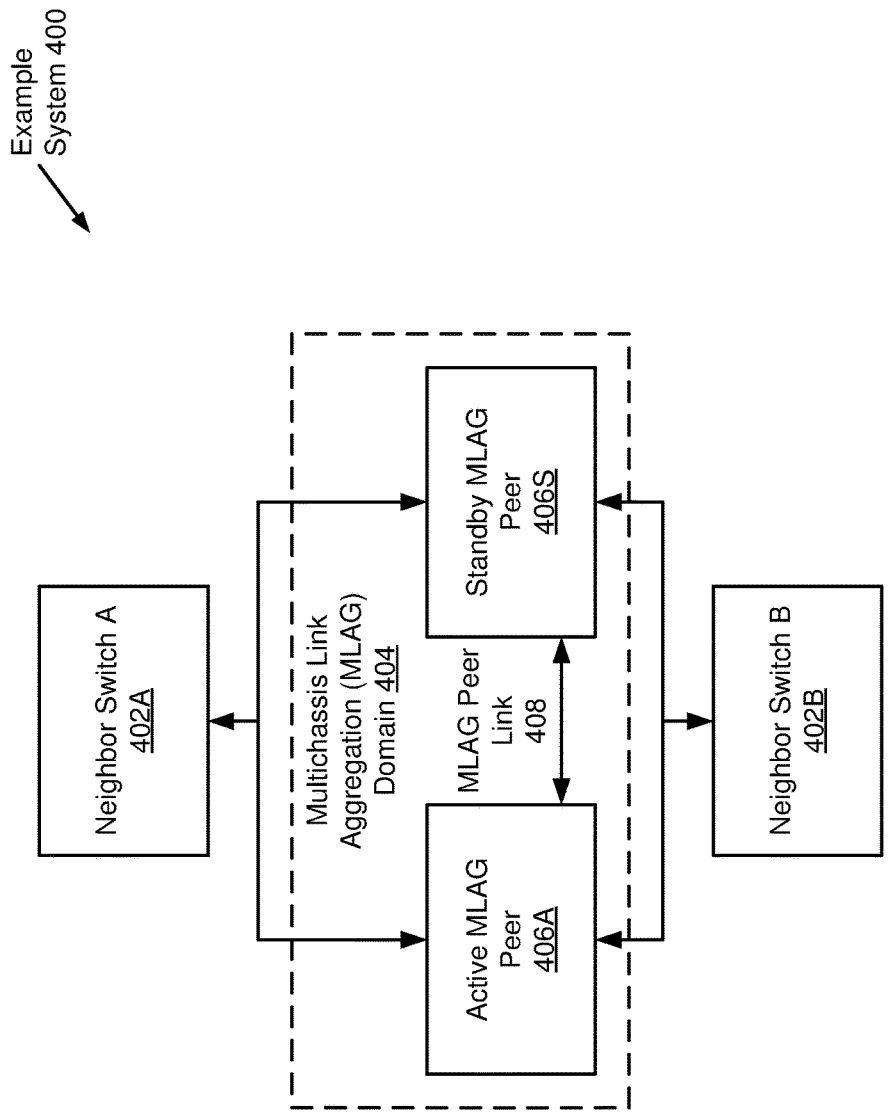
FIGS. 4A-4P show various aspects of an example in accordance with one or more embodiments of the invention.
Figure 4B:
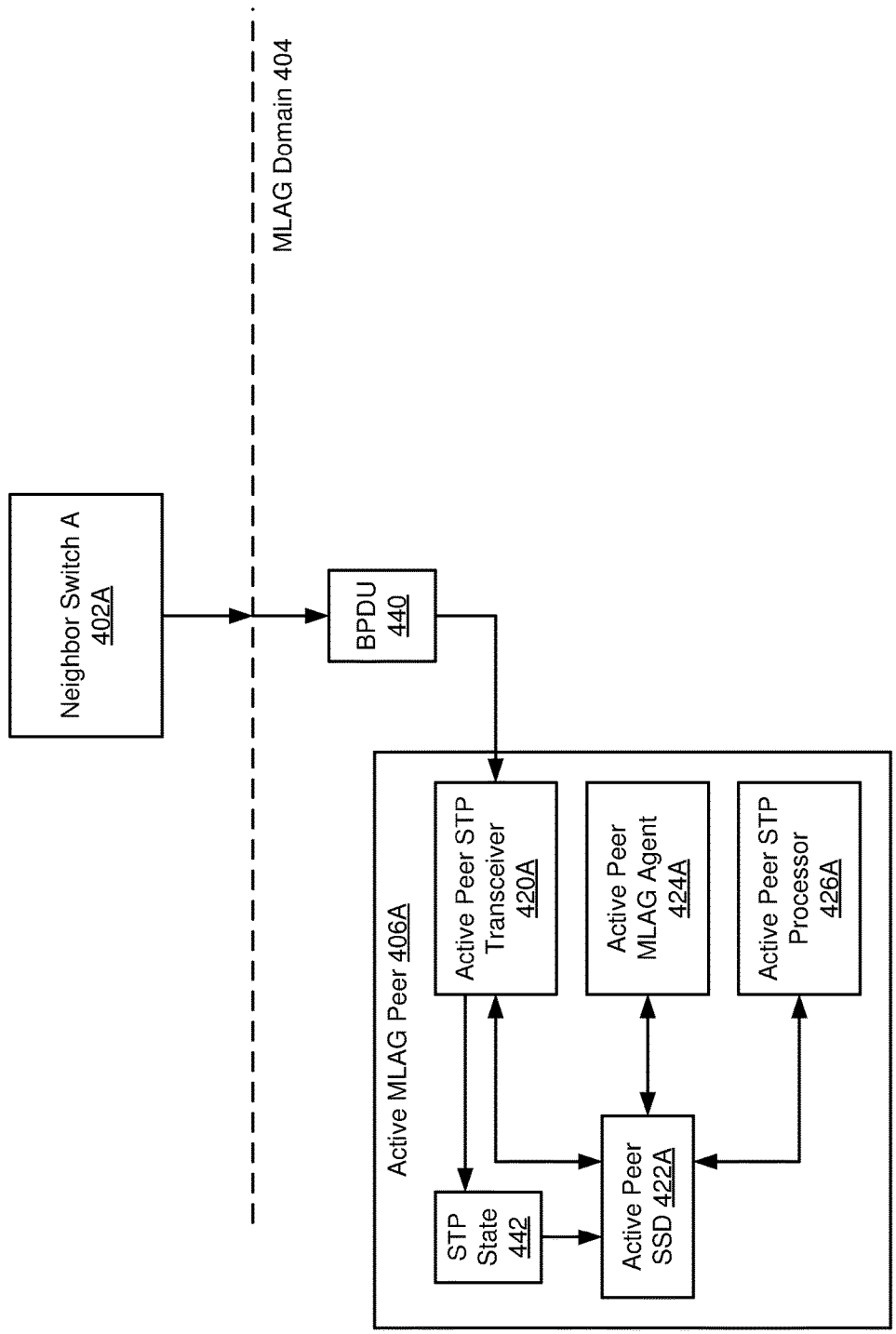
Figure 4C:
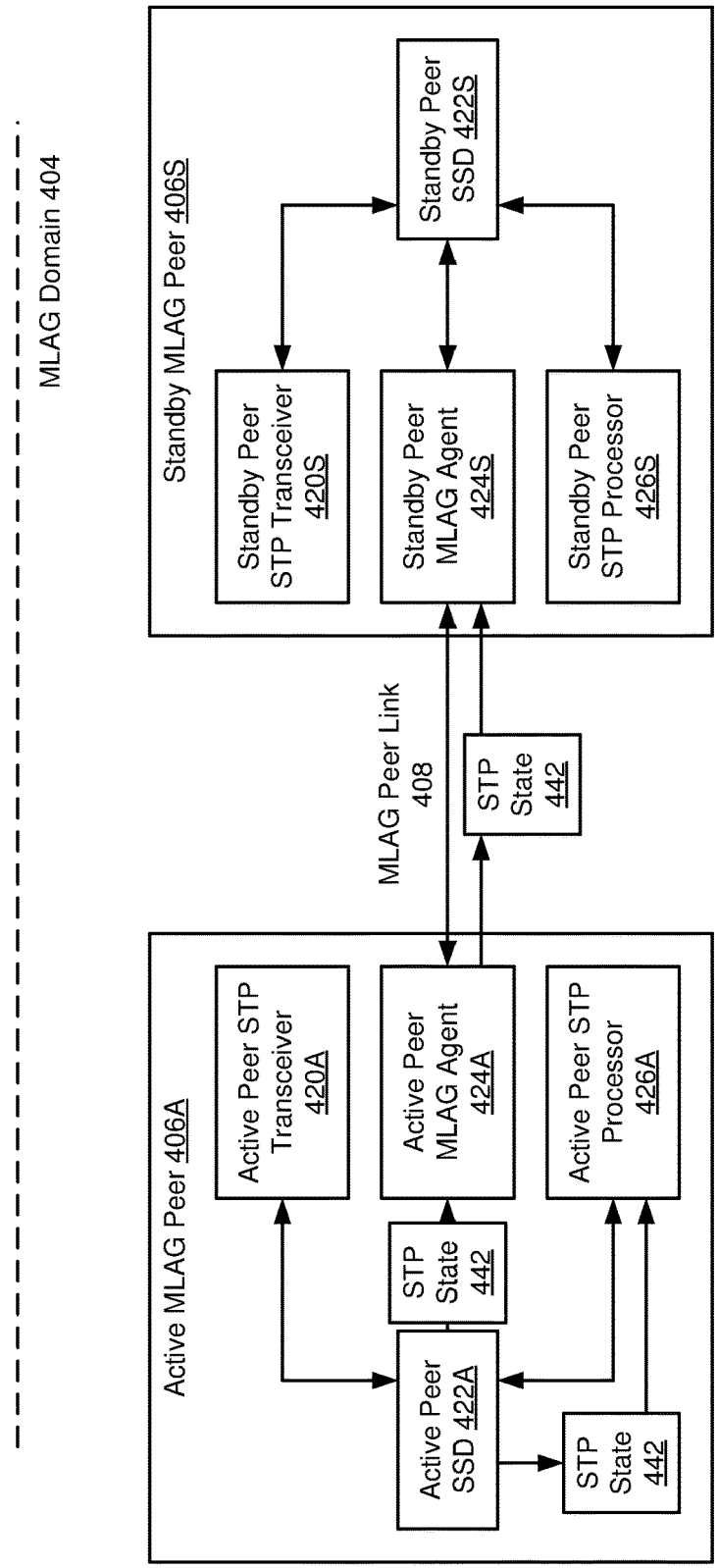
Figure 4D:
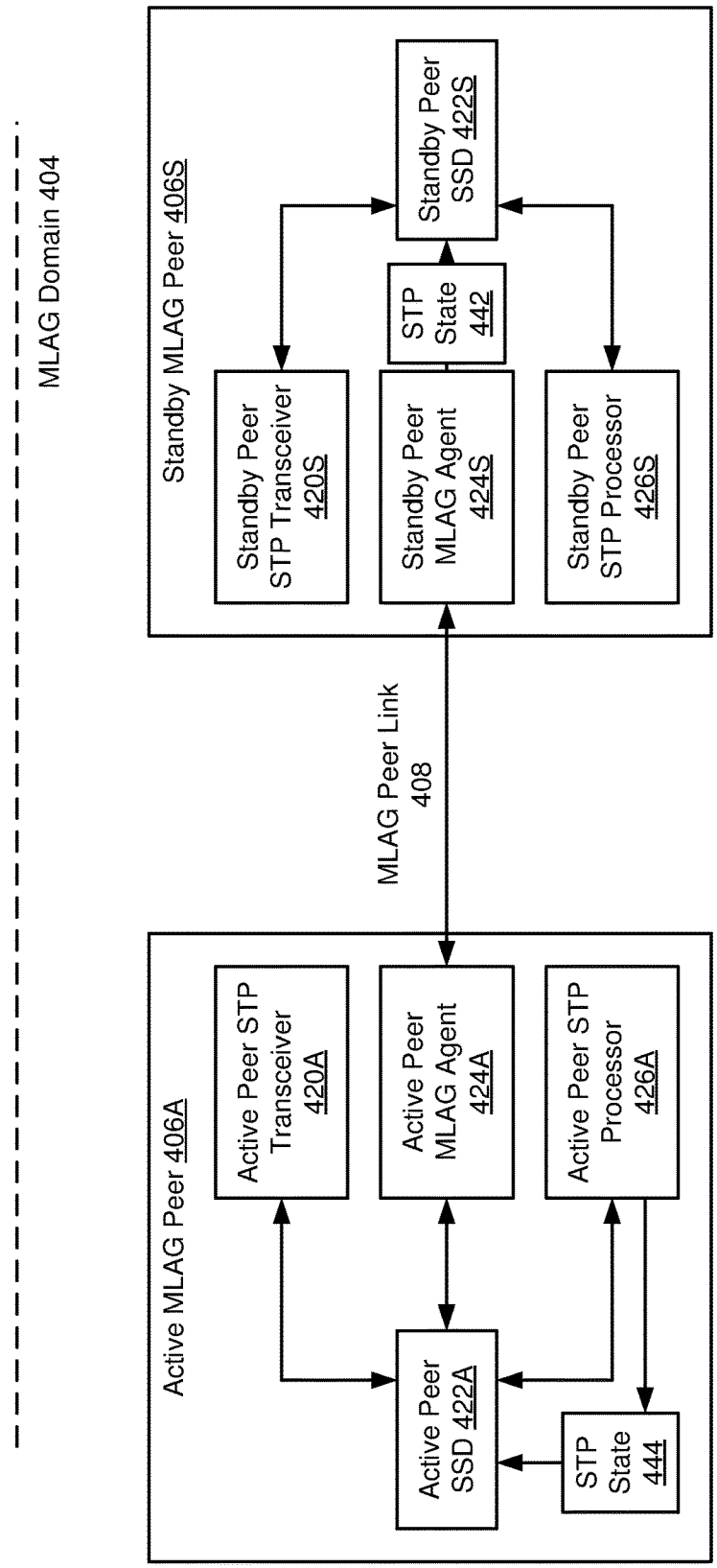
Figure 4E:
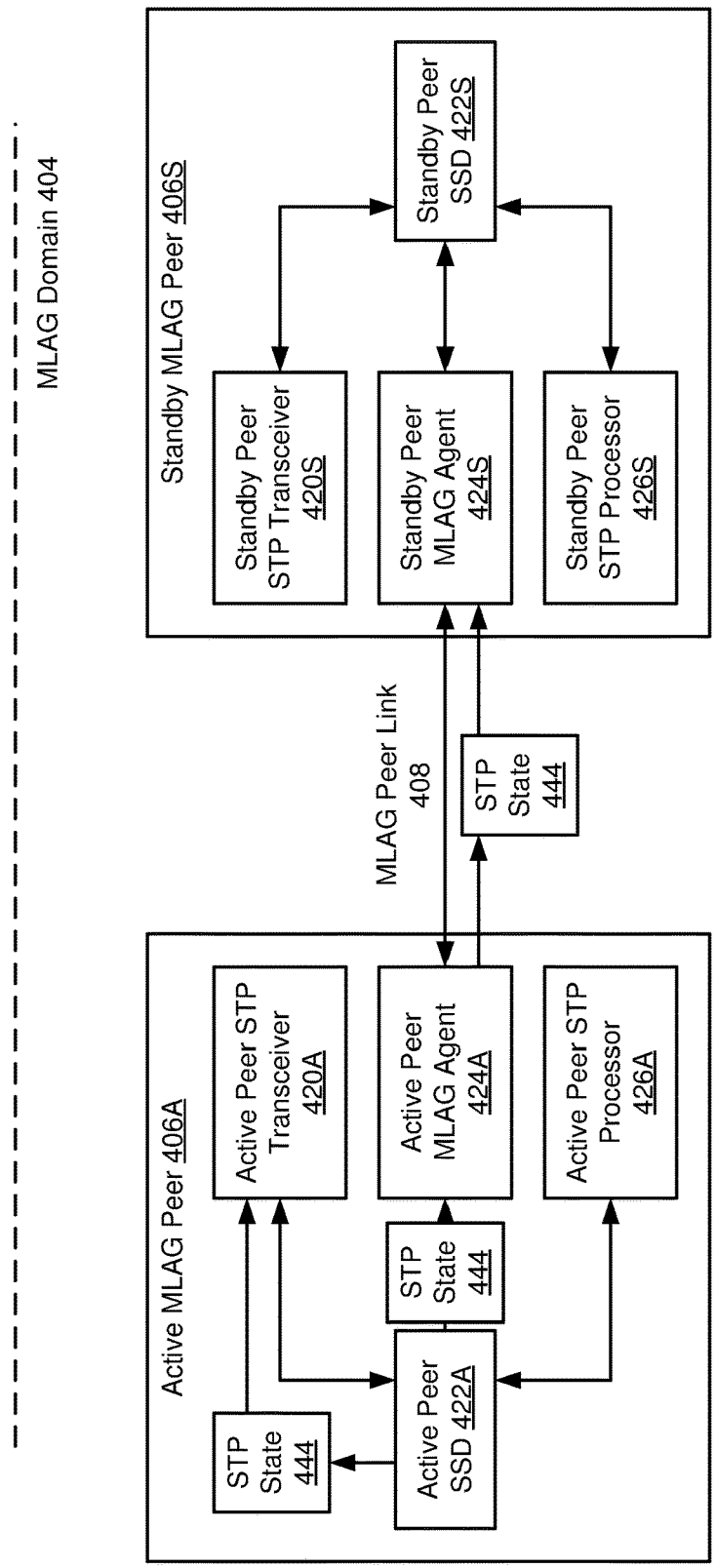
Figure 4F:
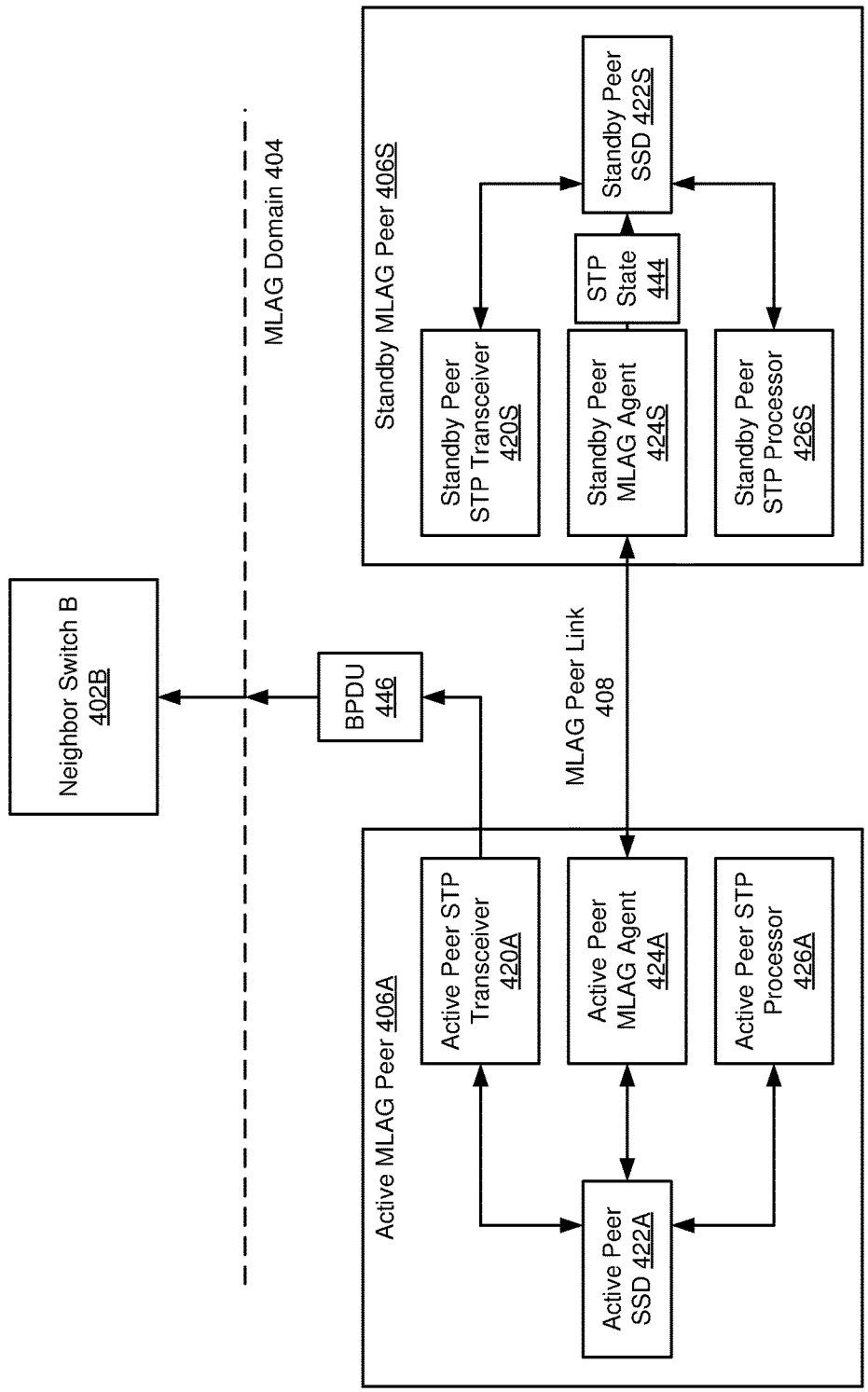
Figure 4G:
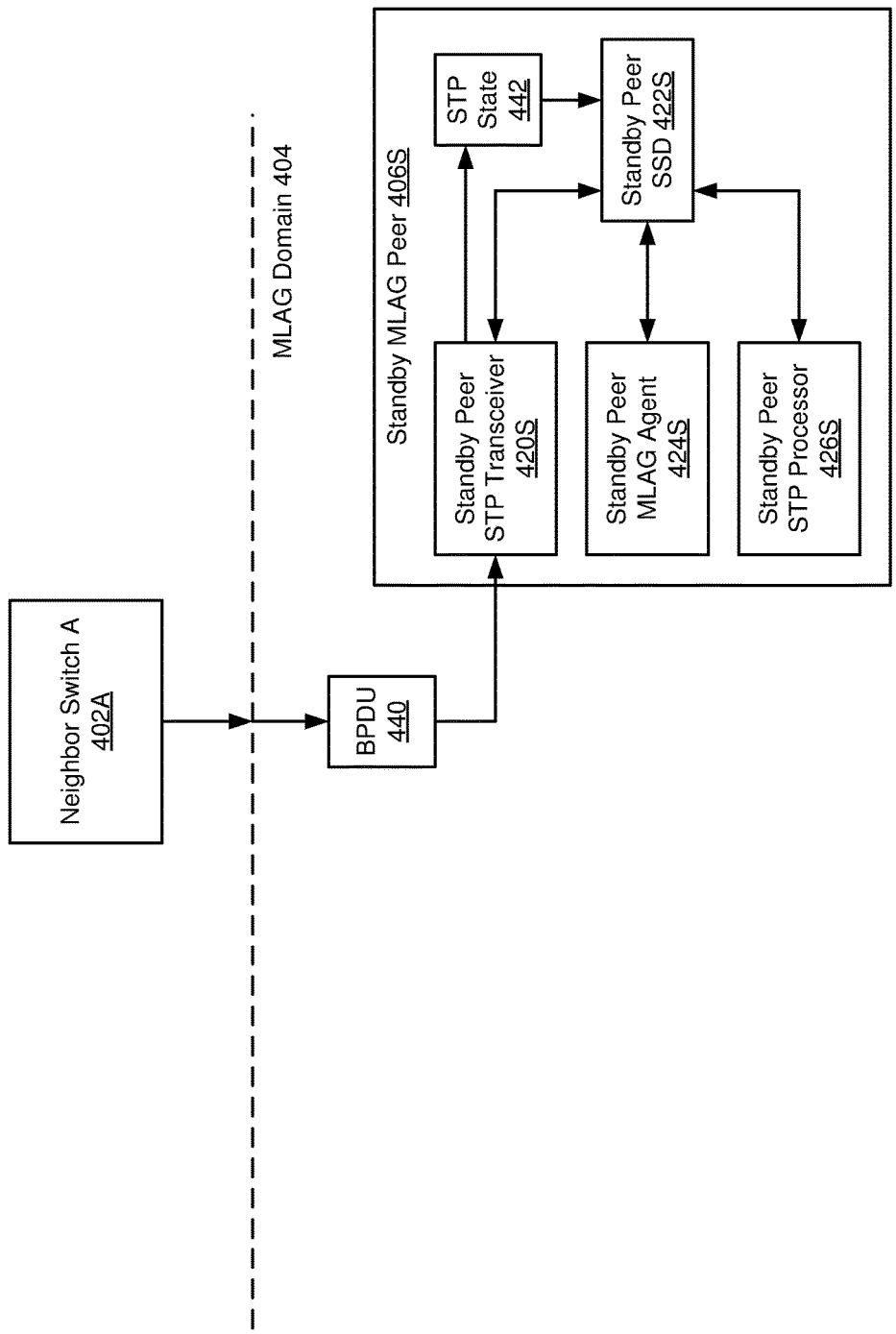
Figure 4H:
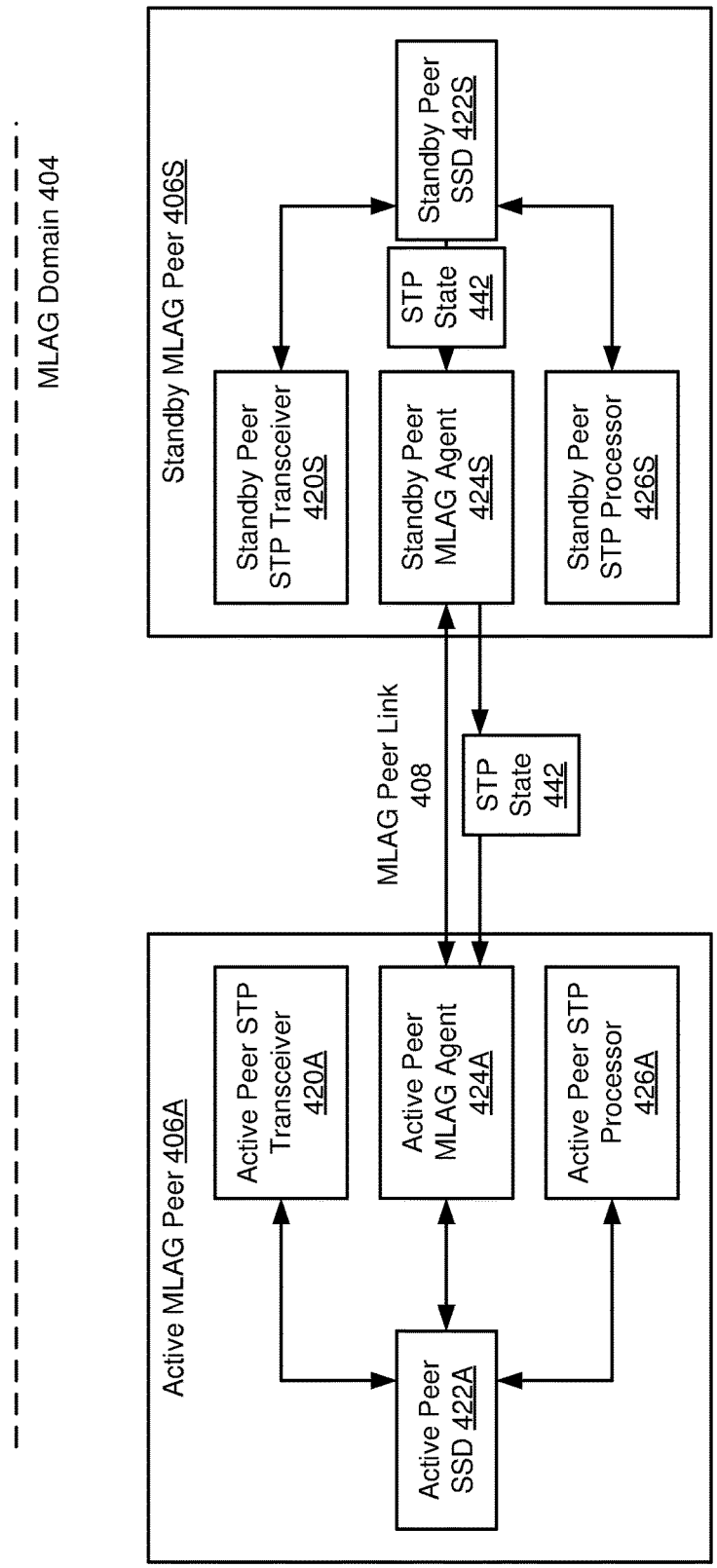
Figure 4I:
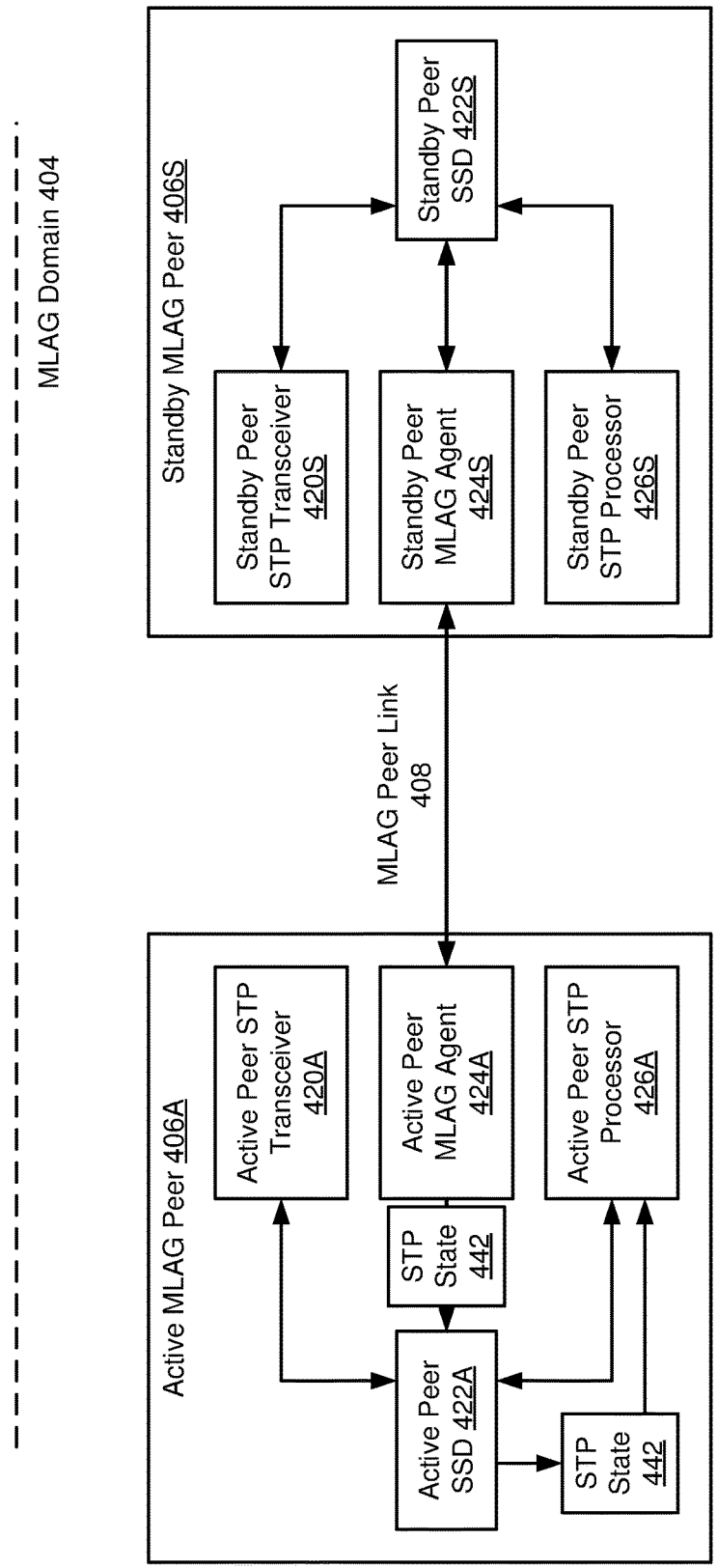
Figure 4J:
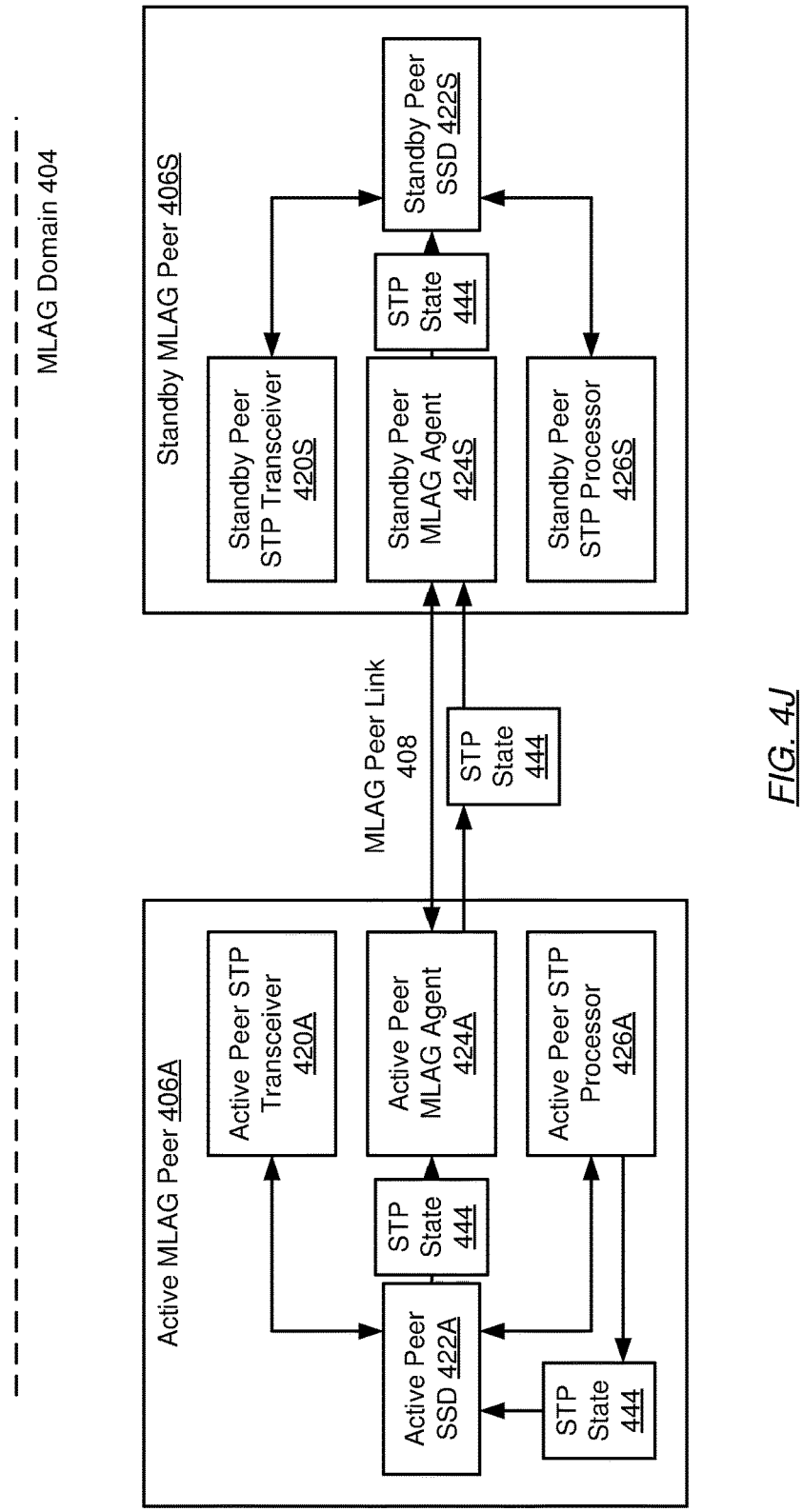
Figure 4K:
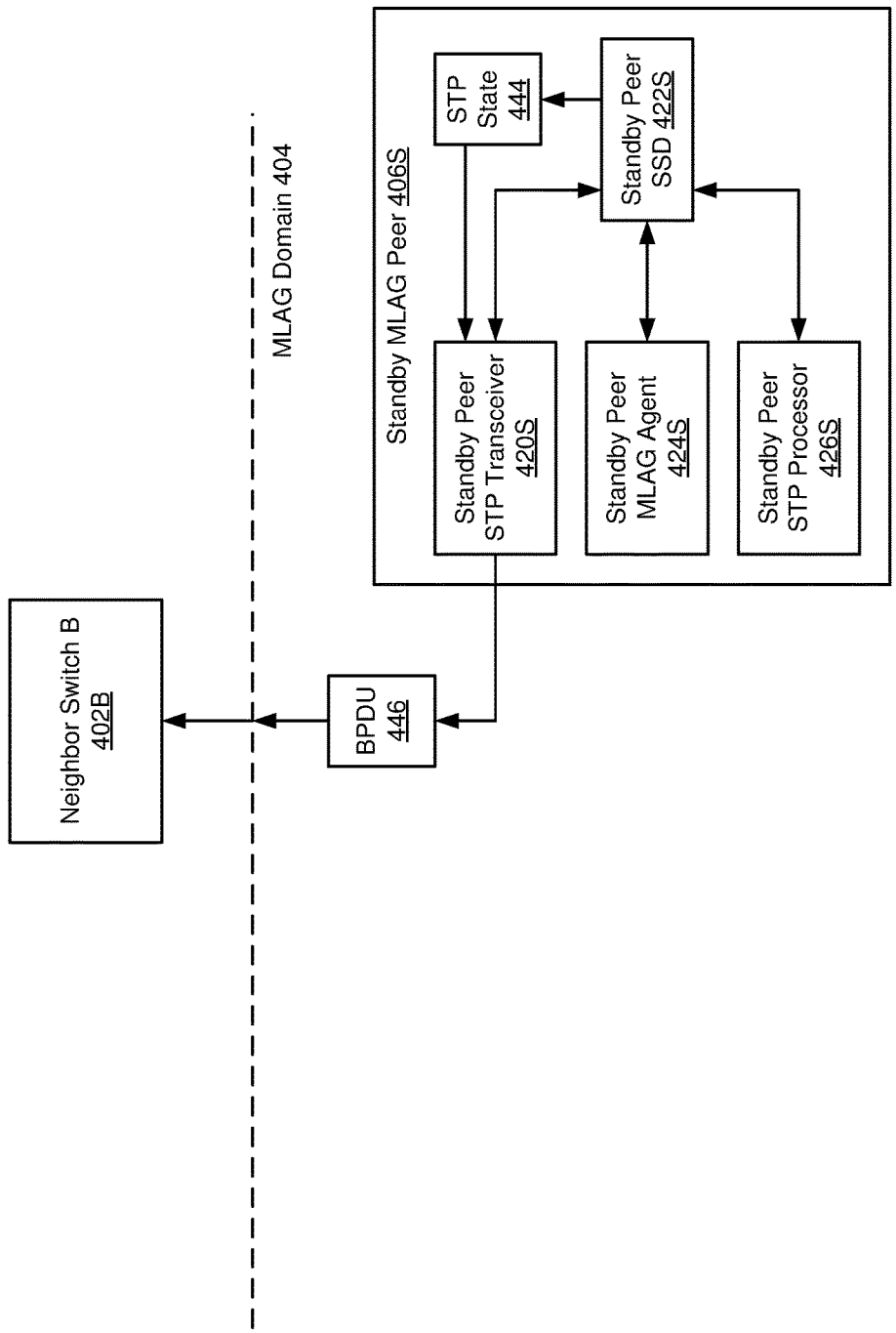
Figure 4L:
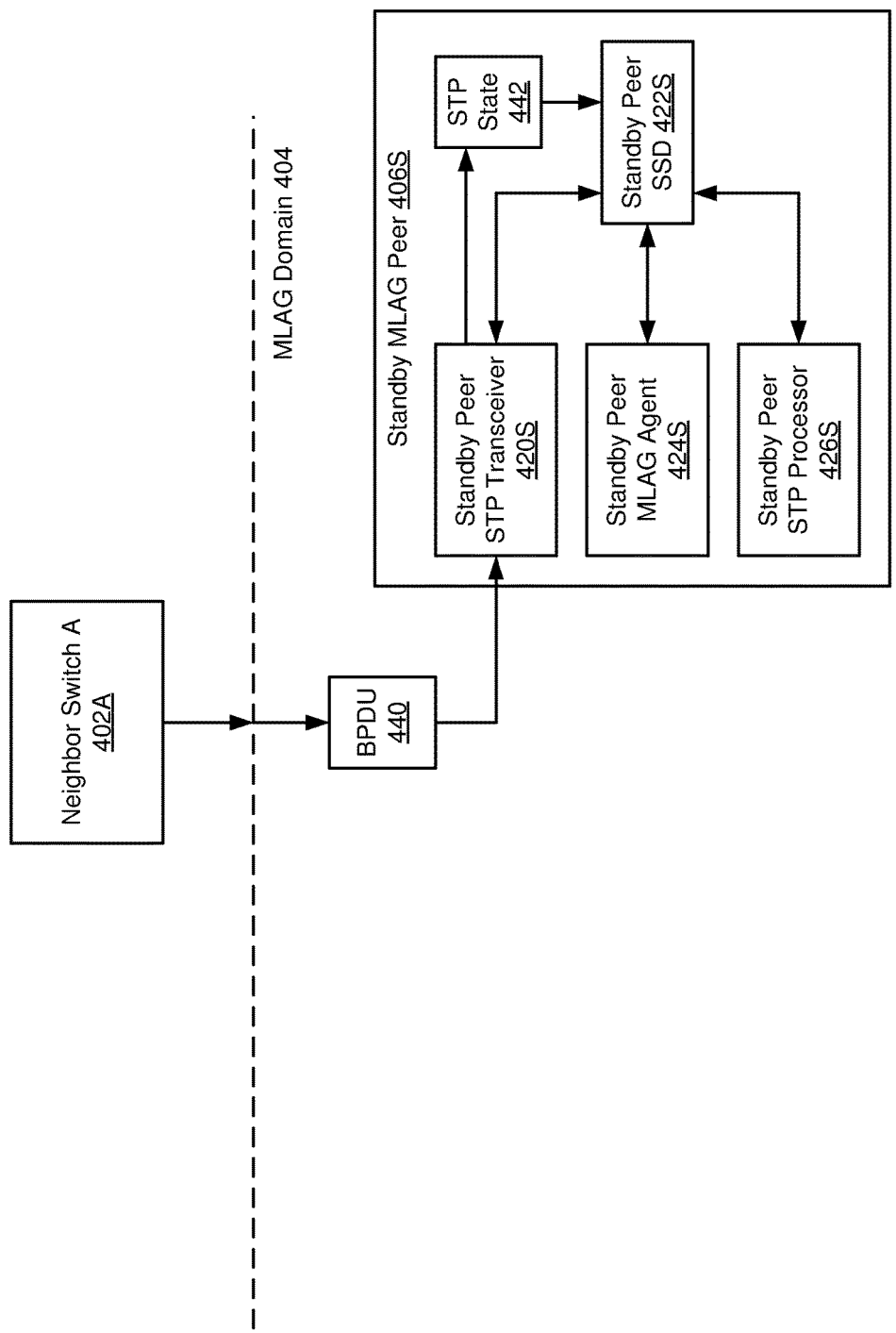
Figure 4M:
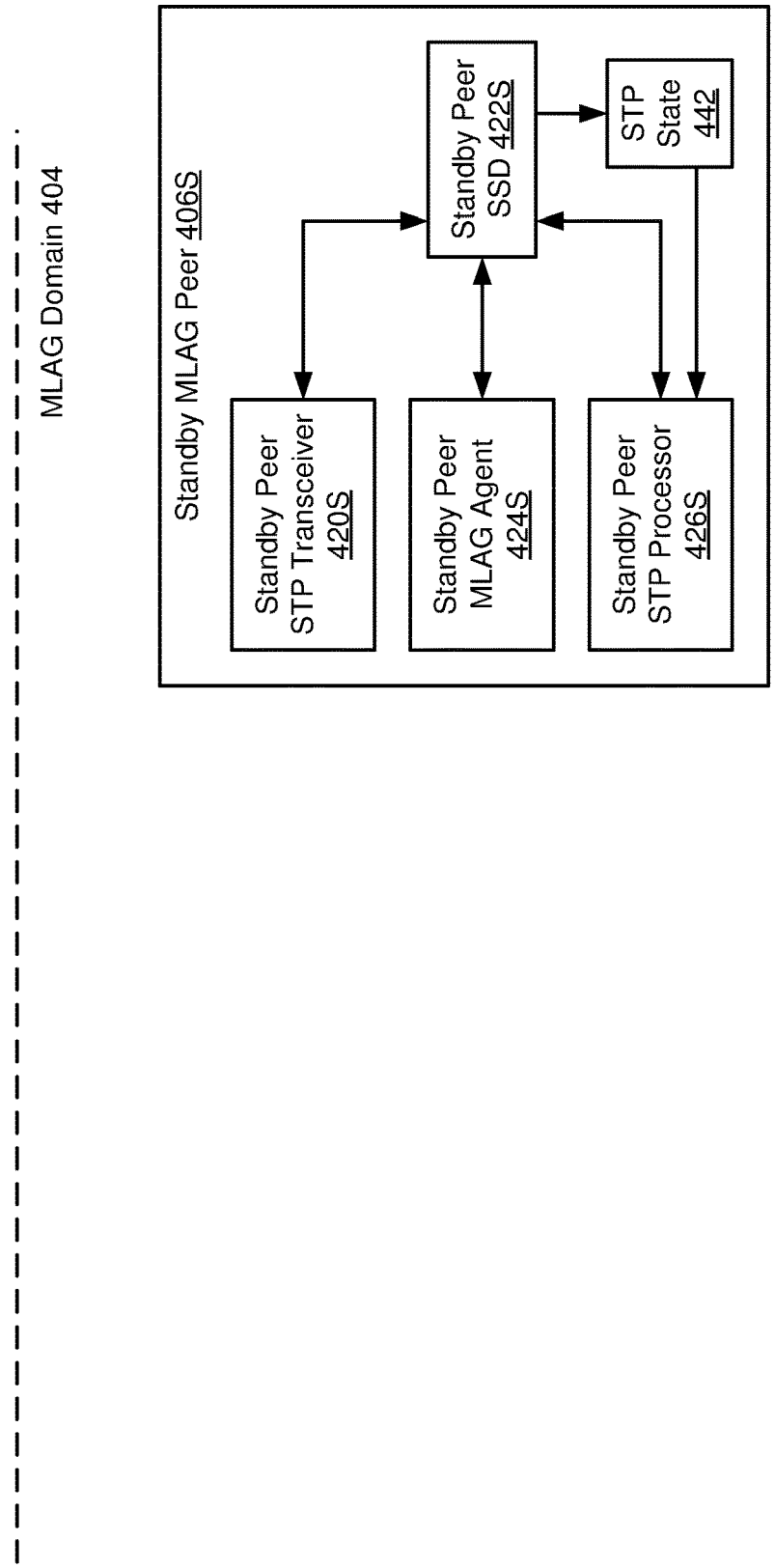
Figure 4N:
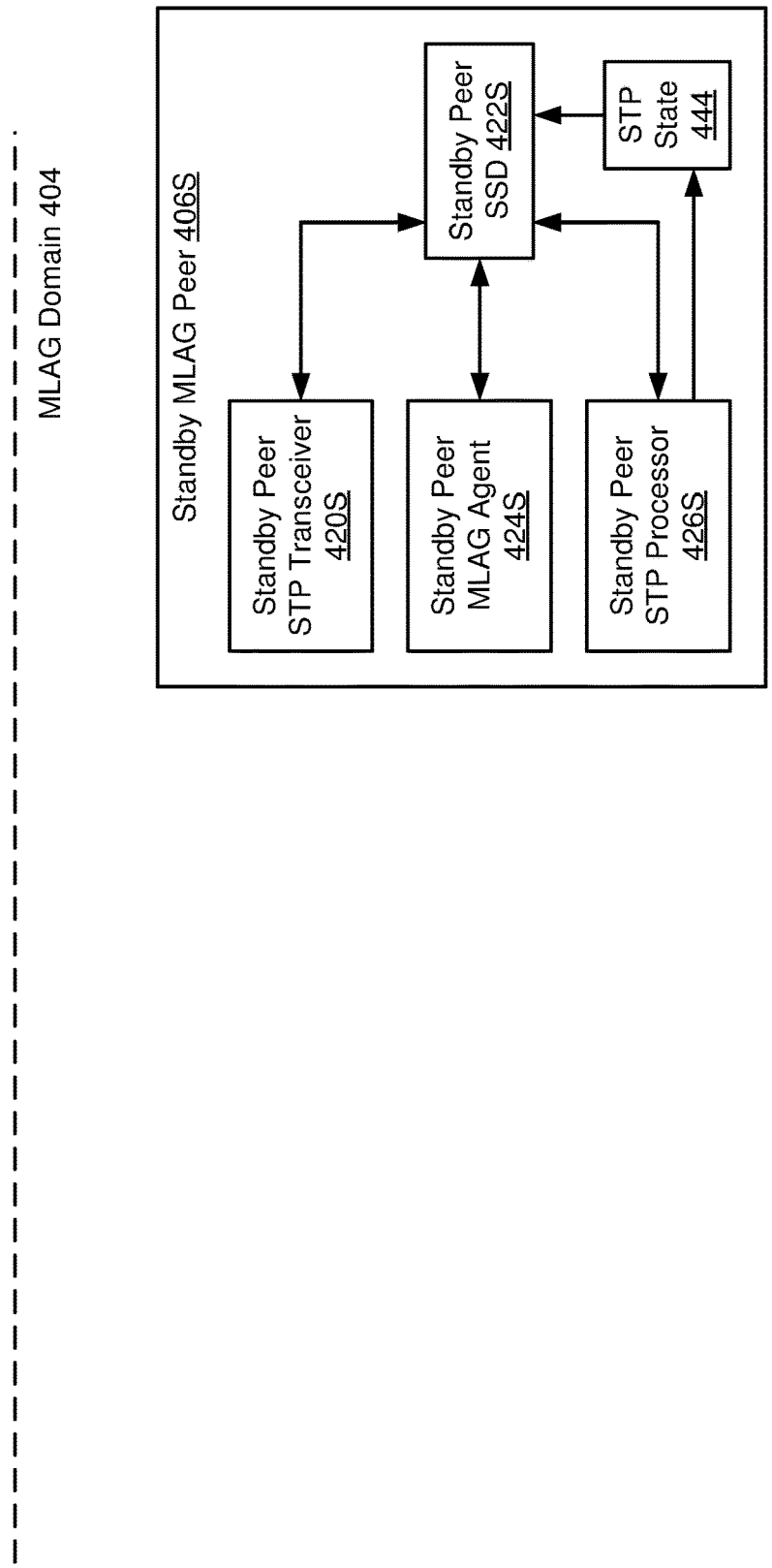
Figure 4O:
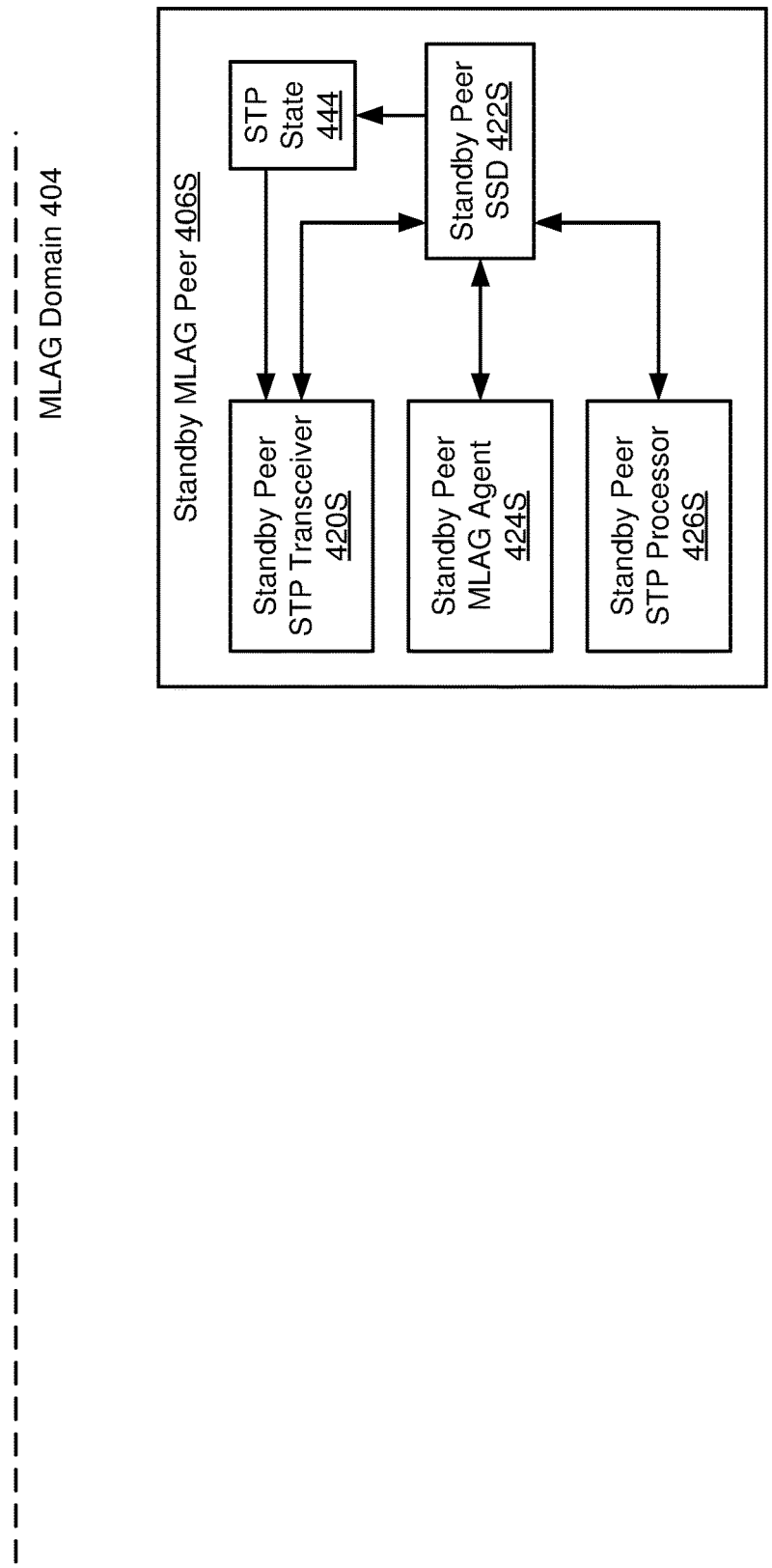
Figure 4P:
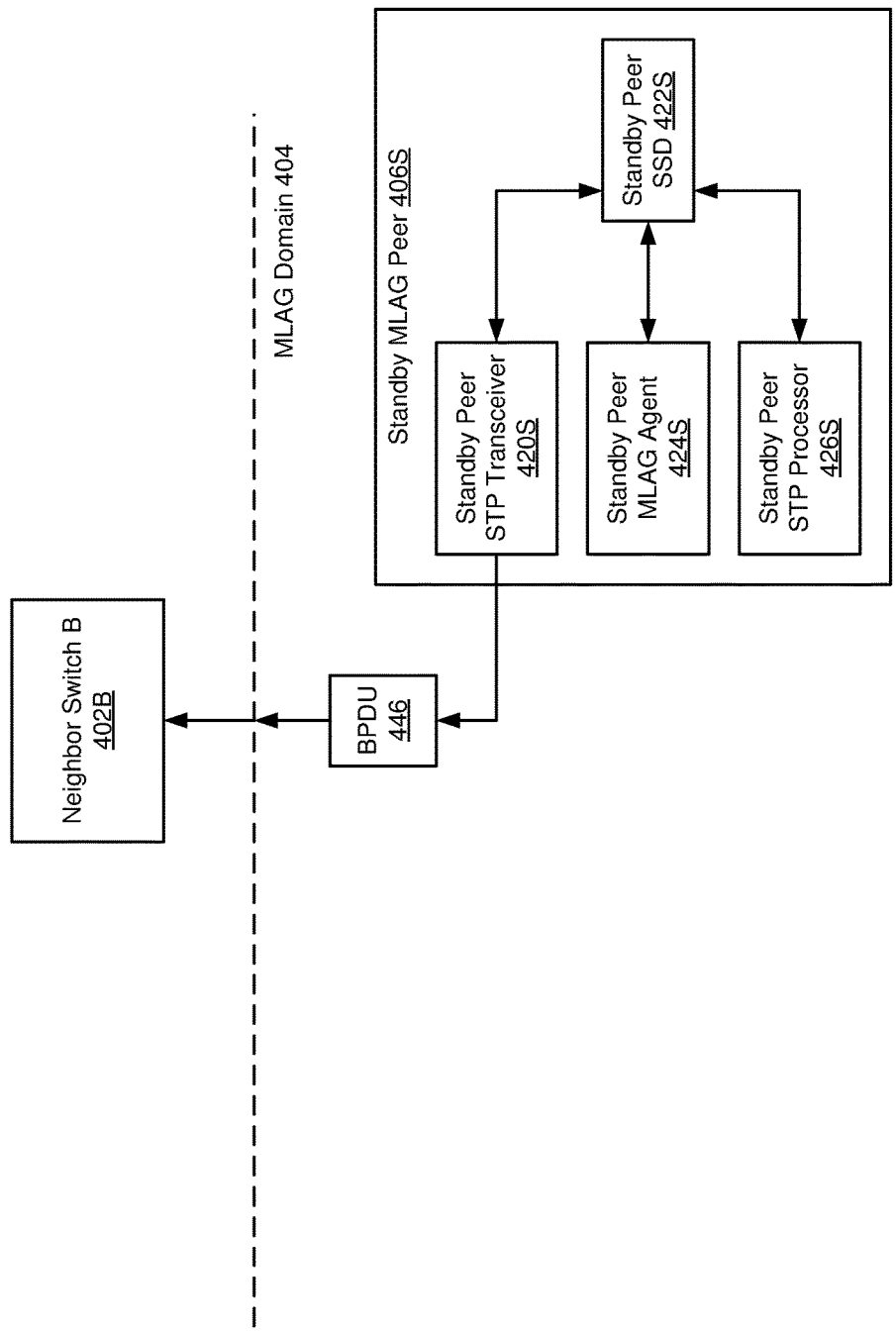

FIGS. 4A-4P show various aspects of an example in accordance with one or more embodiments of the invention. The following example is for explanatory purposes only and not intended to limit the scope of the invention.

FIG. 4A shows an example system in accordance with one or more embodiments of the invention. The example system (400) includes a first neighbor switch (402A) (e.g., an external computing system (ECS)) dually-connected to an active MLAG peer (406A) and a standby MLAG peer (406S) in a MLAG domain (404). Further to the example system (400), a second neighbor switch (402B) is also dually-connected to the active and standby MLAG peers (406A, 406S). Finally, the active MLAG peer (406A) and the standby MLAG peer (406S) are connected to one another via a MLAG peer link (408).

FIGS. 4B-4F describe the handling of bridge protocol data units (BPDUs) arriving at the active MLAG peer (406A) in accordance with one or more embodiments of the invention. Turning to FIG. 4B, FIG. 4B illustrates the transmission of a BPDU (440) from neighbor switch A (402A) to the MLAG domain (404). In this case, the BPDU (440) arrives at the active peer STP transceiver (420A) on the active MLAG peer (406A). Upon receiving the BPDU (440), the active peer STP transceiver (420A) derives STP state (442) from and/or using the BPDU (440). As discussed above, a BPDU may include STP state in the form of path and priority information (e.g., network element priority and MAC address) pertinent to identifying the root bridge and the paths to the root bridge, which is necessary for the calculation of the spanning tree used in the STP. Derivation of the STP state may involve decapsulating the BPDU to obtain the path and priority information embedded within the BPDU.

Subsequent to deriving the STP state (442), the active peer STP transceiver (420A) performs a determination as to whether changes are present in the derived STP state (442). The active peer STP transceiver (420A) may perform this determination by comparing the derived STP state (442) with STP state (e.g., a previous STP state) currently stored in the active peer system state database (SSD) (422A). The active peer STP transceiver (420A) may then determine, based on the aforementioned comparison, that changes are present in the derived STP state (442). In response to this determination, the active peer STP transceiver (420A) stores the STP state (442) (derived from/using the received BPDU (440)) in the active peer SSD (422A).

Turning to FIG. 4C, following the storing of the derived STP state (442) in the active peer SSD (422A) by the active peer STP transceiver (420A), the active peer MLAG agent (424A) obtains the STP state (442) from the active peer SSD (422A). After obtaining the STP state (442), the active peer MLAG agent (424A) transmits the STP state (442) to the standby peer MLAG agent (424S) (on the standby MLAG peer (406S)) via the MLAG peer link (408). In parallel to the active peer MLAG agent (424A) obtaining the STP state (442), the active peer STP processor (426A) also obtains the STP state (442) from the active peer SSD (422A).

Turning to FIG. 4D, following the receiving of the STP state (442) by the standby peer MLAG agent (424S) (from the active peer MLAG agent (424A) via the MLAG peer link (408)), the standby peer MLAG agent (424S) stores the STP state (442) in the standby peer SSD (422S). In parallel to this process, after obtaining the STP state (442) itself, the active peer STP processor (426A) processes the STP state (442) to obtain new STP state (444). Processing of the STP state may involve using the STP state to calculate and/or update the spanning tree used in the implementation of the spanning tree protocol (STP). After obtaining new STP state (444), the active peer STP processor (426A) subsequently stores the new STP state (444) in the active peer SSD (422A).

Turning to FIG. 4E, the active peer MLAG agent (424A) obtains the new STP state (444) from the active peer SSD (422A). The active peer MLAG agent (424A) subsequently shares/transmits the new STP state (444) with/to the standby peer MLAG agent (424S) (on the standby MLAG peer (406S)) via the MLAG peer link (408). Further, the active peer STP transceiver (420A) obtains the new STP state (444) from the active peer SSD (422A).

Turning to FIG. 4F, the standby peer MLAG agent (424S) stores the new STP state (444) (received from the active peer MLAG agent (424A) via the MLAG peer link (408)) in the standby peer SSD (422S). Meanwhile, the active peer STP transceiver (420A) proceeds to generate a new BPDU (446) using the new STP state (444) obtained from the active peer SSD (422A). Finally, after generating the new BPDU (446), the active peer STP transceiver (420A) transmits the new BPDU (446) to neighbor switch B (402B), which may be a next hop along the path towards a destination for the new BPDU (446).

FIGS. 4G-4K describe the handling of bridge protocol data units (BPDUs) arriving at the standby MLAG peer (406S) in accordance with one or more embodiments of the invention. Turning to FIG. 4G, FIG. 4G illustrates the transmission of a BPDU (440) from neighbor switch A (402A) to the MLAG domain (404). In this case, the BPDU (440) arrives at the standby peer STP transceiver (420S) on the standby MLAG peer (406S). Upon receiving the BPDU (440), the standby peer STP transceiver (420S) derives STP state (442) from and/or using the BPDU (440).

Subsequent to deriving the STP state (442), the standby peer STP transceiver (420S) performs a determination as to whether changes are present in the derived STP state (442). The standby peer STP transceiver (420S) may perform this determination by comparing the derived STP state (442) with STP state (e.g., a previous STP state) currently stored in the standby peer system state database (SSD) (422S). The standby peer STP transceiver (420S) may then determine, based on the aforementioned comparison, that changes are present in the derived STP state (442). In response to this determination, the standby peer STP transceiver (420S) stores the STP state (442) (derived from/using the received BPDU (440)) in the standby peer SSD (422S).

Turning to FIG. 4H, following the storing of the derived STP state (442) in the standby peer SSD (422S) by the standby peer STP transceiver (420S), the standby peer MLAG agent (424S) obtains the STP state (442) from the standby peer SSD (422S). The standby peer MLAG agent (424S) obtains the STP state (442). After obtaining the STP state (442), the standby peer MLAG agent (424S) transmits the STP state (442) to the active peer MLAG agent (424A) (on the active MLAG peer (406A)) via the MLAG peer link (408).

Turning to FIG. 4I, following the receiving of the STP state (442) by the active peer MLAG agent (424A) (from the standby peer MLAG agent (424S) via the MLAG peer link (408)), the active peer MLAG agent (424A) stores the STP state (442) in the active peer SSD (422A). After the storing of the STP state (442), the active peer STP processor (426A) obtains the STP state (442) from the active peer SSD (422A).

Turning to FIG. 4J, after obtaining the STP state (442), the active peer STP processor (426A) processes the STP state (442) to obtain new STP state (444). After obtaining new STP state (444), the active peer STP processor (426A) subsequently stores the new STP state (444) in the active peer SSD (422A). The active peer MLAG agent (424A) obtains the new STP state (444) from the active peer SSD (422A). The active peer MLAG agent (424A) subsequently shares/transmits the new STP state (444) with/to the standby peer MLAG agent (424S) (on the standby MLAG peer (406S)) via the MLAG peer link (408), which in turn stores the new STP state (444) in the standby peer SSD (422S).

Turning to FIG. 4K, the standby peer STP transceiver (420S) obtains the new STP state (444) from the standby peer SSD (SSD) and proceeds to generate a new BPDU (446) using the new STP state (444). Generation of the new BPDU may involve generating a media access control (MAC) frame, wherein the payload of the MAC frame includes BPDU-format pertinent information. BPDU-format pertinent information (e.g., fields within a BPDU) may include, but is not limited to, a protocol identifier, a protocol version, a message type, one or more flags, a root bridge identifier, one or more root path costs, a network element identifier, a port identifier, a message age, a maximum age, a hello time, and a forward delay. Finally, after generating the new BPDU (446), the standby peer STP transceiver (420S) transmits the new BPDU (446) to neighbor switch B (402B), which may be a next hop along the path towards a destination for the new BPDU (446).

FIGS. 4L-4P describe the handling of bridge protocol data units (BPDUs) arriving at the standby MLAG peer (406S) after the active MLAG peer (406A) has experienced failover in accordance with one or more embodiments of the invention. Turning to FIG. 4L, FIG. 4L illustrates the transmission of a BPDU (440) from neighbor switch A (402A) to the MLAG domain (404). In this case, in determining/detecting that the active MLAG peer (406A) has undergone a failover event, neighbor switch A (402A) diverts all subsequent BPDUs (including the current BPDU (440)) to the standby MLAG peer (406S). Proceeding with FIG. 4L, the BPDU (440) arrives at the standby peer STP transceiver (420S) on the standby MLAG peer (406S). Upon receiving the BPDU (440), the standby peer STP transceiver (420S) derives STP state (442) from and/or using the BPDU (440).

Subsequent to deriving the STP state (442), the standby peer STP transceiver (420S) performs a determination as to whether changes are present in the derived STP state (442). The standby peer STP transceiver (420S) may perform this determination by comparing the derived STP state (442) with STP state (e.g., a previous STP state) currently stored in the standby peer SSD (422S). Further, the STP peer STP transceiver (420S) may determine, based on the aforementioned comparison, that changes are present in the derived STP state (442). In response to this determination, the standby peer STP transceiver (420S) stores the STP state (442) (derived from/using the received BPDU (440)) in the standby peer SSD (422S).

Turning to FIG. 4M, following the storing of the derived STP state (442) in the standby peer SSD (422S) by the standby peer STP transceiver (420S), the standby peer STP processor (426S) obtains the STP state (442) from the standby peer SSD (422S). As mentioned above, the standby peer STP processor (426S) remains dormant until the active MLAG peer (406A) experiences a failover. In detecting/determining that the active MLAG peer (406A) has undergone a failover, the standby peer STP processor (426S) awakens from its dormant state and resumes responsibility for processing the STP state in place of the active peer STP processor (426A). Additionally, and in contrast to the behavior of the standby MLAG peer (406S) prior to the failover of the active MLAG peer (406S), the standby peer MLAG agent (424S) foregoes obtaining the STP state (442). This occurs because, with the active MLAG peer (406S) undergoing failover, the standby peer MLAG agent (424S) no longer requires/can share (or synchronize) STP state with the active MLAG peer (406S). Said another way, after failover of the active MLAG peer (406S), the standby peer MLAG agent (424S) may enter a dormant or idle state.

Turning to FIG. 4N, after obtaining the STP state (442) from the standby peer SSD (422S), the standby peer STP processor (426S) processes the STP state (442) to obtain new STP state (444). Processing of the STP state may involve using the STP state to calculate and/or update the spanning tree used in the implementation of the STP. Subsequent to obtaining the new STP state (444), the standby peer STP processor (426S) stores the new STP state (444) in the standby peer SSD (422S).

Turning to FIG. 4O, following the storing of the new STP state (444) in the standby peer SSD (422S) by the standby peer STP processor (426S), the standby peer STP transceiver (420S) obtains the new STP state (444) from the standby peer SSD (422S). Further, in FIG. 4P, the standby peer STP transceiver (420S) proceeds to generate a new BPDU (446) using the new STP state (444) obtained from the standby peer SSD (422S). Finally, after generating the new BPDU (446), the standby peer STP transceiver (420S) transmits the new BPDU (446) to neighbor switch B (402B), which may be a next hop along the path towards a destination for the new BPDU (446).

Figure 5A:
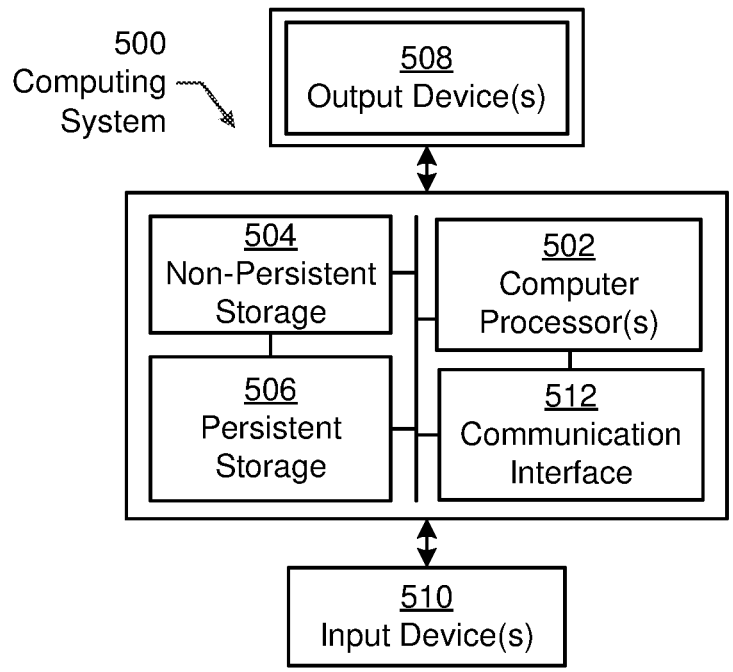
FIGS. 5A and 5B each show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
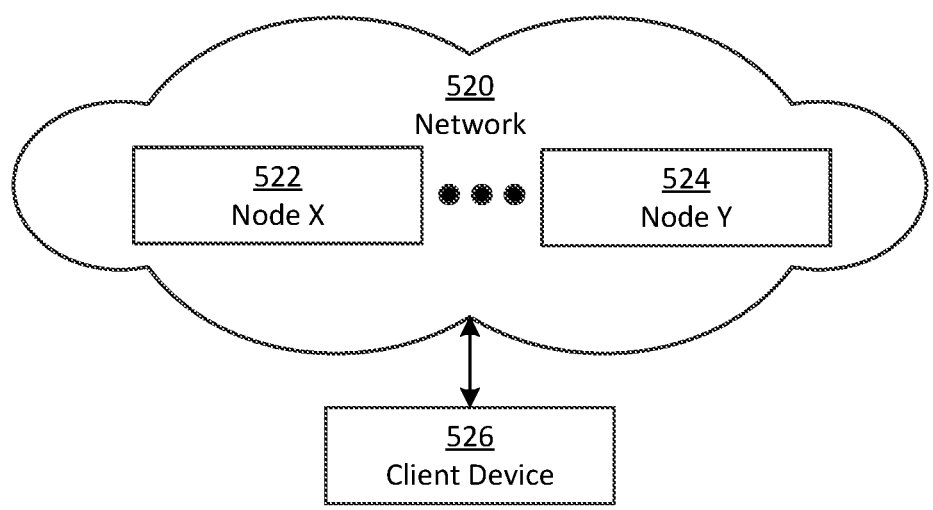

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing spanning tree protocol (STP) state in a multichassis link aggregation (MLAG) domain, comprising:
    receiving, by an active MLAG peer of the MLAG domain, a first bridge protocol data unit (BPDU) from a first external computing system (ECS) operatively connected to the MLAG domain;
    deriving a first STP state from the first BPDU;
    making a first determination that the first STP state is different from a previous STP state;
    processing, based on the first determination, the first STP state to obtain a first new STP state;
    receiving, by the active MLAG peer, a second STP state from a standby MLAG peer of the MLAG domain through a MLAG peer link;

processing the second STP state to obtain a second new STP state; and transmitting the second new STP state to the standby MLAG peer through the MLAG peer link.

2. The method of claim 1, further comprising:

generating, by the active MLAG peer, a new BPDU using the first new STP state; and transmitting the new BPDU to a second ECS operatively connected to the MLAG domain.

3. The method of claim 1, further comprising:

receiving, by the active MLAG peer, a second BPDU from the first ECS;

deriving a third STP state from the second BPDU;

making a second determination that the third STP state is the same as the first STP state;

incrementing, based on the second determination, a BPDU duplicate counter (BDC) value; and refreshing, based on the incrementing, a retention period for the first STP state.

4. The method of claim 1, further comprising:

prior to processing the first STP state:
    transmitting, based on the first determination, the first STP state to the standby MLAG peer of the MLAG domain through the MLAG peer link.

5. A method for processing spanning tree protocol (STP) state in a multichassis link aggregation (MLAG) domain, comprising:

receiving, by a standby MLAG peer of the MLAG domain, a first bridge protocol data unit (BPDU) from a first external computing system (ECS) operatively connected to the MLAG domain;

deriving a first STP state from the first BPDU;

making a first determination that the first STP state is different from a previous STP state;

making a second determination that an active MLAG peer of the MLAG domain is operational;

transmitting, based on the first determination and the second determination, the first STP state to the active MLAG peer, through a MLAG peer link, for processing;

receiving, by the standby MLAG peer, a second BPDU from the first ECS;

deriving a second STP state from the second BPDU;

making a third determination that the second STP state is different from the first STP state;

making a fourth determination that the active MLAG peer is undergoing failover; and processing, based on the third determination and the fourth determination, the second STP state locally to obtain a second new STP state.

6. The method of claim 5, further comprising:

receiving, by the standby MLAG peer, a first new STP state from the active MLAG peer through the MLAG peer link;

generating a new BPDU using the first new STP state; and transmitting the new BPDU to a second ECS operatively connected to the MLAG domain.

7. The method of claim 5, further comprising:

prior to processing the second STP state locally:
    awakening, based on the fourth determination, a standby peer STP processor on the standby MLAG peer from a dormant state,
    wherein the standby peer STP processor processes the second STP state.

8. A multichassis link aggregation (MLAG) peer, comprising:

an active peer spanning tree protocol (STP) transceiver, an active peer STP processor, an active MLAG peer agent, and an active peer system state database (SSD), wherein the active peer STP transceiver is programmed to:
    receive a first bridge protocol data unit (BPDU) from a first ECS of a plurality of ECSs;
    derive a first STP state from the first BPDU;
    make a first determination that the first STP state is different from a previous STP state, wherein the active peer STP processor is programmed to:
    process, in response to the first determination, the first STP state to obtain a first new STP state;
    after the second STP state is received by the MLAG peer, process the second STP state to obtain a second new STP state; and;

wherein the active peer MLAG agent is programmed to:
    receive a second STP state from a standby MLAG peer of a MLAG domain through a MLAG peer link;
    transmit the second new STP state to the standby MLAG peer via the MLAG peer link.

9. The MLAG peer of claim 8, wherein the active peer STP transceiver is further programmed to:

obtain, in response to storage of the first new STP state, the first new STP state from the active peer SSD;

generate a new BPDU using the first new STP state; and transmit the new BPDU to a second ECS of the plurality of ECSs.

10. The MLAG peer of claim 8, wherein the MLAG peer is a switch, a router, or a multilayer switch.

11. The MLAG peer of claim 8, wherein the active peer MLAG agent is further programmed to generate a new BPDU using the first new STP state; and wherein the active peer STP transceiver is further programmed to transmit the new BPDU to a second ECS operatively connected to the MLAG domain.

12. The MLAG peer of claim 8, wherein the active peer STP transceiver is further programmed to:
    receive a second BPDU from the first ECS;
    derive a third STP state from the second BPDU;
    make a second determination that the third STP state is the same as the first STP state;
    increment, based on the second determination, a BPDU duplicate counter (BDC) value; and wherein the active peer STP processor is further programmed to:
    refresh, based on the incrementing, a retention period for the first STP state.

13. The MLAG peer of claim 12, wherein the active peer MLAG agent is further programmed to:

transmit, based on the first determination, the first STP state to the standby MLAG peer of the MLAG domain through the MLAG peer link.

\* \* \* \* \*